United States Patent
Shen et al.

(10) Patent No.: US 12,384,976 B2
(45) Date of Patent: Aug. 12, 2025

(54) APPARATUS AND PROCESS FOR UPGRADING HEAVY HYDROCARBONS

(71) Applicant: EXXONMOBIL TECHNOLOGY AND ENGINEERING COMPANY, Annandale, NJ (US)

(72) Inventors: Eric B. Shen, Basking Ridge, NJ (US); Anjaneya S. Kovvali, Herndon, VA (US); Aruna Ramkrishnan, Bridgewater, NJ (US); Arun K. Sharma, Hellertown, PA (US); Samuel J. Cady, Morristown, NJ (US); Stephen H. Brown, Lebanon, NJ (US); Rustom M. Billimoria, Hellertown, PA (US); Brenda A. Raich, Annandale, NJ (US); Bryan A. Patel, Jersey City, NJ (US); Phillip K. Schoch, Bridgewater, NJ (US); John Della Mora, North York (CA)

(73) Assignee: EXXONMOBIL TECHNOLOGY AND ENGINEERING COMPANY, Annandale, NJ (US)

( * ) Notice: Subject to any disclaimer, the term of this patent is extended or adjusted under 35 U.S.C. 154(b) by 323 days.

(21) Appl. No.: 17/639,840

(22) PCT Filed: Aug. 14, 2020

(86) PCT No.: PCT/US2020/046268
§ 371 (c)(1),
(2) Date: Mar. 2, 2022

(87) PCT Pub. No.: WO2021/045882
PCT Pub. Date: Mar. 11, 2021

(65) Prior Publication Data
US 2022/0333024 A1    Oct. 20, 2022

Related U.S. Application Data

(60) Provisional application No. 62/896,153, filed on Sep. 5, 2019.

(51) Int. Cl.
*C10G 65/00* (2006.01)
*B01D 3/10* (2006.01)
(Continued)

(52) U.S. Cl.
CPC ............. *C10G 67/049* (2013.01); *B01D 3/10* (2013.01); *B01D 3/143* (2013.01); *B01J 8/20* (2013.01);
(Continued)

(58) Field of Classification Search
CPC .......... C10G 9/38; C10G 45/00; C10G 47/26; C10G 65/12; C10G 67/0454; C10G 67/049; C10G 69/06
See application file for complete search history.

(56) References Cited

U.S. PATENT DOCUMENTS

| | | |
|---|---|---|
| 8,617,386 B2 | 12/2013 | Bhattacharyya et al. |
| 11,767,477 B2 * | 9/2023 | Shen ................. C10G 67/0454 208/86 |
| 2011/0198265 A1 * | 8/2011 | Colvar ................. C10G 67/049 208/56 |

FOREIGN PATENT DOCUMENTS

| | | | |
|---|---|---|---|
| CA | 3074616 A1 | 3/2019 | |
| WO | 2001060952 A1 | 8/2001 | |
| WO | WO-2013102639 A1 * | 7/2013 | ............. C10G 45/00 |

OTHER PUBLICATIONS

U.S. Appl. No. 17/639,820.*
(Continued)

*Primary Examiner* — Prem C Singh
*Assistant Examiner* — Brandi M Doyle
(74) *Attorney, Agent, or Firm* — Vorys, Sater, Seymour and Pease LLP

(57) ABSTRACT

Systems and methods are provided for partial upgrading of heavy hydrocarbon feeds to meet transport specifications, such as pipeline transport specifications. The systems and methods can allow for one or more types of improvement in heavy hydrocarbon processing prior to transport. In some aspects, the systems and methods can produce a partially upgraded heavy hydrocarbon product that satisfies one or more transport specifications while incorporating an increased amount of vacuum gas oil and a reduced amount of pitch into the partially upgraded heavy hydrocarbon product. In other aspects, the systems and methods can allow for increased incorporation of hydrocarbons into the fraction upgraded for transport, thereby reducing or minimizing the amount of hydrocarbons requiring an alternative method of disposal or transport. In still other aspects, the systems and methods can allow for reduced incorporation of external streams into the final product for transport while still satisfying one or more target properties.

11 Claims, 4 Drawing Sheets

(51) Int. Cl.
  *B01D 3/14* (2006.01)
  *B01J 8/20* (2006.01)
  *C10G 67/04* (2006.01)

(52) U.S. Cl.
  CPC . *C10G 2300/202* (2013.01); *C10G 2300/301* (2013.01); *C10G 2300/302* (2013.01); *C10G 2300/308* (2013.01); *C10G 2300/42* (2013.01)

(56) References Cited

OTHER PUBLICATIONS

International Search Report and Written Opinion for corresponding PCT application PCT/US2020/046268, dated Nov. 11, 2020.

* cited by examiner

APPARATUS AND PROCESS FOR UPGRADING HEAVY HYDROCARBONS

FIELD OF THE INVENTION

Systems and methods are provided for upgrading of heavy hydrocarbons.

BACKGROUND OF THE INVENTION

Oil sands are a type of non-traditional petroleum source that remains challenging to fully exploit. Due to the nature of oil sands, substantial processing can be required at or near the extraction site just to create bitumen/crude oil fractions that are suitable for transport. However, oil sands extraction sites are also often in geographically remote locations, which can substantially increase the construction and maintenance costs for any processing equipment that is used at the oil sands site.

One strategy for preparing bitumen for transport via pipeline is to add a low viscosity diluent to the bitumen. Naphtha fractions are an example of a suitable diluent. However, the diluent can correspond to up to 30 to 50 wt % of the diluted bitumen that is transported. Alternative diluent, such as light crude, could require even greater amounts. This means that a substantial amount of naphtha (and/or other diluent) has to be transported to the extraction site, resulting in substantial cost. The use of such a large volume of diluent also means that the effective capacity of the pipeline is reduced. Additionally, the large volume of diluent consumes capacity in the pipestill or other separator at the destination, thus reducing the available separator capacity at the destination.

What is needed are improved systems and methods for preparing bitumen and/or other heavy hydrocarbon crude fractions for pipeline transport. The improved systems and methods can preferably provide one or more of: reduced or minimized dependence on external process streams; reduced or minimized capital equipment costs; and reduced or minimized creation of fractions that require an alternate transport method.

U.S. Pat. No. 9,868,915 describes systems and methods for processing heavy hydrocarbon feeds using a combination of slurry hydroprocessing and coking. Some of the methods include separating a feed into portions having lower Conradson carbon content and higher Conradson carbon content. The lower Conradson carbon content portion is then processed by coking, while the higher Conradson carbon content portion is processed by slurry hydroprocessing. The slurry hydroprocessing conditions are described as including net conversion of at least 80 wt % relative to either 975° F. (524° C.) or 1050° F. (566° C.). The feed to the slurry hydroprocessing is described as including up to 1.0 wt % of nitrogen.

U.S. Pat. No. 8,568,583 describes a high conversion partial upgrade process for forming a synthetic crude oil from a bitumen feed that includes diluent. After an initial separation to remove the diluent, the partial upgrade process includes hydroprocessing a bottoms fraction of the feed in an ebullating bed reactor. The unconverted bottoms from hydroprocessing are then blended with a portion of the bitumen for inclusion in the final synthetic crude oil.

SUMMARY

In an aspect, a method for upgrading a heavy hydrocarbon feed is provided. The method includes splitting an initial feedstock to form at least a first feedstock portion and a second feedstock portion. The first feedstock portion can include 15 wt % to 95 wt % of the initial feedstock. The initial feedstock can include a heavy hydrocarbon feed and 10 wt % or more of a first diluent, the first diluent optionally including a 177° C.− portion. The method further includes separating the first feedstock portion to form a first fraction comprising a 566° C.+ portion, a diluent fraction comprising at least a portion of the first diluent, and one or more additional fractions comprising a 177° C.+ portion. The heavy hydrocarbon feed can include an API gravity of 15° or less. The method further includes exposing at least a portion of the first fraction to hydroconversion conditions in a hydroconversion stage to form a hydroconverted effluent. The hydroconversion conditions can include a net conversion of less than 90 wt % relative to 524° C. The method can further include separating at least a pitch fraction comprising a 566° C.+ portion and an olefin-containing fraction from the hydroconverted effluent. The method can further include hydrotreating the olefin-containing fraction to form a hydrotreated product. Additionally, the method can include blending the second feedstock portion, the one or more additional fractions, and at least a portion of the hydrotreated product to form a processed heavy hydrocarbon product having a kinematic viscosity at 7.5° C. of 400 cSt or less, an API gravity of 18° or more, or a combination thereof. Optionally, the processed heavy hydrocarbon product can include 20 wt % or less of a 177° C.− fraction relative to a weight of the processed heavy hydrocarbon product.

In another aspect, a system for upgrading a heavy hydrocarbon feed is provided. The system includes a feed splitter. The feed splitter includes a first splitter outlet and a second splitter outlet. The system further includes an atmospheric separation stage. The atmospheric separation stage includes an atmospheric stage inlet in fluid communication with the first splitter outlet, an atmospheric bottoms outlet, and one or more additional outlets. The system further includes a vacuum separation stage. The vacuum separation stage includes a vacuum stage inlet in fluid communication with the atmospheric bottoms outlet, a vacuum bottoms outlet, and one or more vacuum gas oil outlets. The system further includes a slurry hydroprocessing stage. The slurry hydroprocessing stage includes a slurry hydroprocessing reactor, a reactor inlet in fluid communication with the vacuum bottoms outlet, a light ends outlet, a slurry hydroprocessing effluent outlet, and a pitch outlet. The system further includes a hydrotreating stage. The hydrotreating stage includes a hydrotreating inlet in fluid communication with the slurry hydroprocessing effluent outlet, and a hydrotreated effluent outlet. Additionally, the system includes a blending stage for forming a blended product, the blending stage being in fluid communication with the second splitter outlet, the one or more additional outlets, the one or more vacuum gas oil outlets, and the hydrotreated effluent outlet.

DETAILED DESCRIPTION

Figure 1:
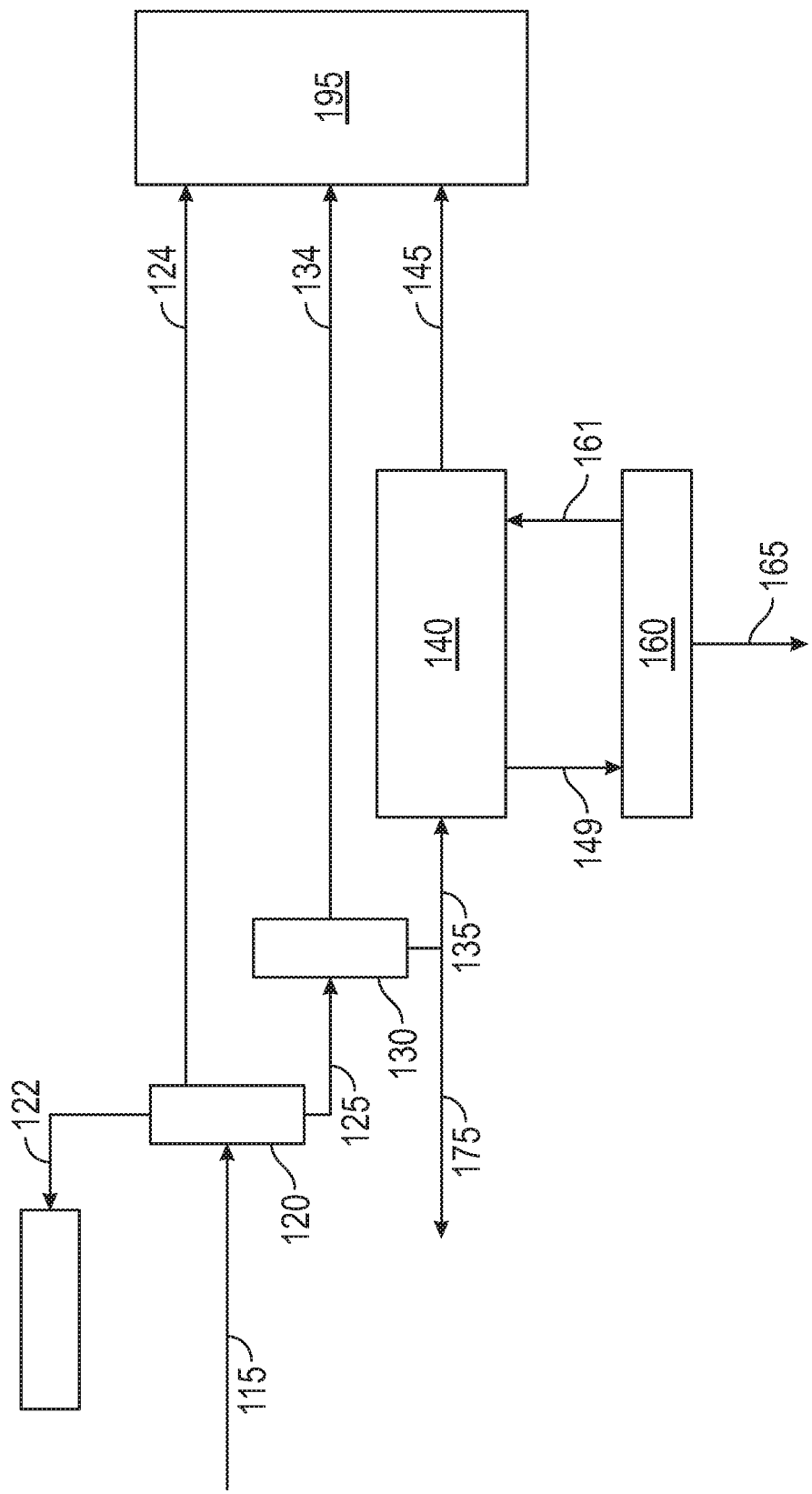
FIG. 1 shows an example of a configuration for upgrading a heavy hydrocarbon feed.

All numerical values within the detailed description and the claims herein are modified by "about" or "approximately" the indicated value, and take into account experimental error and variations that would be expected by a person having ordinary skill in the art.

Overview

In various aspects, systems and methods are provided for partial upgrading of heavy hydrocarbon feeds to meet transport specifications, such as pipeline transport specifications. The systems and methods can allow for one or more types of improvement in heavy hydrocarbon processing prior to transport. In some aspects, the systems and methods can produce a partially upgraded heavy hydrocarbon product that satisfies one or more transport specifications while incorporating an increased amount of vacuum gas oil and a reduced amount of pitch into the partially upgraded heavy hydrocarbon product. In other aspects, the systems and methods can allow for increased incorporation of hydrocarbons into the fraction upgraded for transport, thereby reducing or minimizing the amount of hydrocarbons requiring an alternative method of disposal or transport. In still other aspects, the systems and methods can allow for reduced incorporation of external streams into the final product for transport while still satisfying one or more target properties.

Creating a partially upgraded heavy hydrocarbon product including an increased amount of vacuum gas oil and/or a reduced amount of pitch (relative to the heavy hydrocarbon feed) can provide a variety of advantages. In various aspects, the partially upgraded product can satisfy one or more transport specifications, such as transport specifications associated with pipeline transport. This can be beneficial, for example, for upgrading a heavy hydrocarbon feed extracted from a remote location to form a product that can be transported by pipeline to an existing refinery. Additionally or alternately, the partially upgraded product can also have improved product quality. Further additionally or alternately, the hydroconversion conditions can be tuned to vary the amounts of desired product fractions. This can allow for production of synthetic crude oils with various target amounts of naphtha, distillate, and/or vacuum gas oil.

One or more of the above advantages can be achieved by using a limited severity hydroconversion process to treat at least a portion of the vacuum resid boiling range components of a heavy hydrocarbon feed. Slurry and ebullating bed hydroconversion processes are examples of processes that can be operated at limited hydroconversion severity. More generally, any hydroconversion process can be used where the catalyst involved in the hydroconversion process can be withdrawn from the reactor and replaced with fresh or recycled catalyst during operation of the process in the reactor. This can also be referred to as withdrawing and replacing catalyst while the process is on-line. For practical reasons related to rapid fouling and/or deactivation of catalyst, fixed bed processes (or other processes where catalyst withdrawal cannot be performed while the process is on-line) are generally not suitable for performing a limited severity hydroconversion process as described herein. The operating conditions for the hydroconversion are selected to achieve a limited amount of net conversion relative to 524° C., such as less than 90 wt % net conversion relative to 524° C. For example, the amount of net conversion relative to 524° C. can be 60 wt % to 89 wt %, or 70 wt % to 89 wt %, or 60 wt % to 85 wt %, or 70 wt % to 85 wt %, or 75 wt % to 89 wt %. It is noted that the conversion relative to 566° C. will be higher than the conversion relative to 524° C. In some aspects, the limited severity hydroconversion process can be used to treat all of the vacuum resid present in a heavy hydrocarbon feed, while in other aspects a portion of the heavy hydrocarbon feed can bypass all processing and be directly added to a final product.

Other potential advantages of the partially upgraded heavy hydrocarbon product can be related to the resulting product quality. By using hydroconversion for processing of the vacuum bottoms from the heavy hydrocarbon feed, conversion can be performed on the vacuum bottoms while reducing or minimizing coke formation. For example, processing the vacuum bottoms in a thermal process such as coking can result in formation of 20 wt % or more of coke relative to the 566° C.+ portion of the vacuum bottoms, or 30 wt % or more. Under conventional methods where the vacuum bottoms are at least partially incorporated into a synthetic crude product, such vacuum bottoms are often processed in a refinery by coking. By contrast, the pitch or unconverted bottoms from hydroconversion as described herein can correspond to 15 wt % or less of the 566° C.+ portion, or 10 wt % or less. Thus, by using hydroconversion, additional liquid products are formed in the hydroconversion reactor, in place of the coke that would be reformed by processing the 566° C.+ portion at a conventional refinery. Additionally, the transport of 566° C.+ material by pipeline is avoided, so that the use of pipeline capacity for transporting material that will become coke is reduced or minimized.

In some aspects, the portion of the feed that is exposed to the hydroconversion conditions can be separated from the feed by performing a separation based on boiling point. For example, a vacuum distillation tower can be used to separate at least a vacuum resid boiling range portion of the feed from another portion of the feed. Alternatively, a series of flash separators could be used to isolate a fraction including a vacuum resid boiling range portion. In other aspects, the vacuum resid portion of the feed that is exposed to hydroconversion can correspond to a fraction that is formed by solvent deasphalting. In such aspects, at least a portion of the feed can be deasphalted, and at least a portion of the residue or rock from deasphalting can be exposed to the limited severity hydroconversion process. The deasphalter rock from solvent deasphalting corresponds to a raffinate from the solvent deasphalting process. In still other aspects, a combination of boiling point separation and solvent deasphalting can be used to form a vacuum resid portion for hydroconversion.

It has been discovered that performing limited hydroconversion on the vacuum resid portion of a heavy hydrocarbon feed, and then recombining the hydroconverted liquid effluent with the lower boiling portions of the feed, can result in a processed heavy hydrocarbon product suitable for pipeline transport while requiring a reduced or minimized amount of transport diluent to meet pipeline transport specifications, such as a processed heavy hydrocarbon product including 20 wt % or less transport diluent. It is noted that the pitch or bottoms fraction from the limited hydroconversion is not recombined. Additionally, the vacuum gas oil portion of the processed heavy hydrocarbon product can correspond to an unexpectedly high weight percentage of the product. Additionally, in some aspects (such as aspects involving slurry hydroprocessing) the systems and methods can avoid the need for including a separate particle removal step prior to hydroprocessing. In some optional aspects, the systems and methods can be used in combination with a modified paraffinic froth treatment that allows for increased recovery of hydrocarbons by increasing the asphaltenes retained in the bitumen.

In some aspects, increasing the amount of the vacuum gas oil relative to the amount of higher boiling components can correspond to forming a partially upgraded heavy hydrocarbon product containing 50 wt % or more vacuum gas oil, or 55 wt % or more vacuum gas oil, or 60 wt % or more vacuum gas oil, such as up to 75 wt % vacuum gas oil or possibly still higher. Additionally, the partially upgraded heavy hydrocarbon product can include 5.0 wt % or less of 593° C.+ components, or 3.0 wt % or less, such as down to substantially no 593° C.+ components. Optionally, the partially upgraded heavy hydrocarbon product can include 5.0 wt % or less of 566° C.+ components, or 3.0 wt % or less, such as down to substantially no 566° C.+ components.

In other aspects, increasing the amount of vacuum gas oil relative to the amount of higher boiling components can be used to enable a configuration where a substantial portion of the heavy hydrocarbon feed (optionally after solvent removal) is passed into the partially upgraded heavy hydrocarbon product without further processing. In such aspects, the heavy hydrocarbon feed is split into at least two portions. A second portion of the initial feed is blended into the final product without passing through a solvent separation, boiling point separation, or other separation stage; and without passing through a feed conversion stage (such as a hydroconversion stage or a coking stage). The first portion of the feed, corresponding to 5 wt % to 95 wt % of the initial feed, or 15 wt % to 95 wt %, or 20 wt % to 95 wt %, or 5 wt % to 80 wt %, or 15 wt % to 80 wt %, or 20 wt % to 80 wt %, is separated and processed as described herein, including processing of at least a 566° C.+ portion of the feed under hydroconversion conditions with a net conversion of 60 wt % to 89 wt % relative to 524° C. In some preferred aspects, the first portion of the initial feed can correspond to 30 wt % to 95 wt % of the initial feed, or 30 wt % to 80 wt %, or 30 wt % to 70 wt %, or 40 wt % to 95 wt %, or 40 wt % to 80 wt %, or 40 wt % to 70 wt %, or 30 wt % to 50 wt %, or 50 wt % to 70 wt %. By not including the pitch from this hydroconversion in the final product, the amount of the heavy hydrocarbon feed blended into the final product can be increased or maximized. This can allow a partially upgraded heavy hydrocarbon product to be formed that is suitable for transport while reducing or minimizing the amount of the initial feed that is processed. This can substantially reduce both the capital costs and the processing costs for generating a product suitable for transport while also maintaining an increased amount of vacuum gas oil in the product. Additionally, by avoiding addition of pitch to the partially upgraded heavy hydrocarbon product, the need to remove particles can be reduced or minimized. To the degree particles are present in the heavy hydrocarbon feed, such particles can be segregated into the pitch during the limited hydroconversion. It is noted that including a bypass portion of the heavy hydrocarbon feed in the partially upgraded heavy hydrocarbon product results in a composition that includes a vacuum bottoms portion, and therefore is not a "bottomless" crude.

Preparing heavy hydrocarbon feeds for pipeline transport often involves achieving target values for a plurality of separate properties. First, the viscosity of the processed heavy hydrocarbon feed needs to be suitable or roughly suitable for pipeline transport. This can correspond to, for example, having a kinematic viscosity at 7.5° C. of 360 cSt or less, or 350 cSt or less, such as down to 250 cSt or possibly still lower. Second, the density of the processed heavy hydrocarbon feed needs to be suitable or roughly suitable for pipeline transport. This can correspond to, for example, having an API Gravity of 18° or more, or 19° or more. Third, the particulate content of the processed heavy hydrocarbon feed needs to be sufficiently low. Fourth, an olefin content of the processed heavy hydrocarbon feed also needs to be sufficiently low, such as having an olefin content of 1.0 wt % or less.

Conventionally, a target kinematic viscosity and a target density are achieved in part by blending a heavy hydrocarbon feed with a suitable transport diluent, such as a naphtha boiling range diluent. While this is effective, addition of a sufficient amount of transport diluent can present a variety of challenges. For example, when attempting to add diluent to native bitumen, the amount of transport diluent required to meet both the kinematic viscosity and density requirements is usually substantial, corresponding to 30 vol % or more of the final product suitable for pipeline transport. The large amount of transport diluent required is due in part to the fact that the amount of diluent needed to achieve the kinematic viscosity requirement is typically substantially greater than the amount of transport diluent needed to achieve the density requirement. In various aspects, a goal of making a partially upgraded heavy hydrocarbon product can be to reduce the amount of giveaway in density.

With regard to particulate content, some conventional methods of processing mined tar sands involve an initial processing step to reject particles, such as performing a froth treatment. Even after such treatment (such as when a naphthenic froth treatment is used), a particle separation step may be required prior to attempting pipeline transport. In other aspects, such as when a paraffin froth treatment is used, the conditions used for rejection of particles tend to also lead to rejection of substantial portions of the asphaltenes present in the tar sands. This rejection of asphaltenes represents a loss of hydrocarbon yield relative to the original hydrocarbon content of the tar sands. The rejection of the asphaltenes also reduces or minimizes the ability to use the resulting bitumen for production of asphalt products.

In various aspects, a processing system including at least a separation stage and a hydroconversion stage can be used to provide an improved method for preparing heavy hydrocarbons for pipeline transport. The separation stage can correspond to an atmospheric separator (such as an atmospheric distillation tower or flash separator), a vacuum separator (such as a vacuum distillation tower), a solvent deasphalter, or a combination thereof. The hydroconversion stage can correspond to a slurry hydroprocessing stage, an ebullating bed hydroprocessing stage, a moving bed reactor stage, or another type of hydroconversion stage that allows for on-line catalyst withdrawal and replacement. When a boiling point separation is performed, at least one separation stage can be used to separate out a portion of any diluent present in the initial feedstock, such as separating out up to substantially all of the diluent present in the initial feedstock. In aspects where a vacuum distillation is included in the separation stage, the vacuum distillation stage can be used to cut deeply, so as to reduce or minimize the volume of feed passed to hydroconversion. For example, if the input to the vacuum distillation is a bottoms product from an atmospheric distillation, the vacuum distillation can cut deeply into the bottoms product. This can reduce or minimize the amount of vacuum resid that is subsequently processed. The vacuum resid (or at least a portion thereof) is then passed into a limited severity hydroconversion stage. Optionally, in addition to and/or instead of deeply cutting into the atmospheric bottoms, the vacuum resid can be deasphalted to produce deasphalted oil and rock. In such aspects, the deasphalter rock can be used as the feed for the hydroconversion stage instead of the vacuum tower bottoms. Yet another option can be to use the deasphalter as the primary separator in the separation stage, rather than using a fraction from a distillation tower as the feed to the deasphalter.

In various aspects, the separation stage can be used to form a fraction comprising a vacuum resid portion that is then passed into the hydroconversion stage. The fraction containing a vacuum resid portion that is passed into the hydroconversion stage corresponds to 50 wt % or less of the heavy hydrocarbon feed, or 40 wt % or less, or 35 wt % or less, or 30 wt % or less, such as down to 20 wt % or possibly still lower. Optionally, the fraction containing the vacuum resid portion can have a lower API gravity than the API gravity of the heavy hydrocarbon feed.

In some aspects, the net conversion can be achieved by using a plurality of reactors in series. This can be beneficial, for example, in configurations where the hydroconversion stage corresponds to a plurality of ebullating bed reactors. Without being bound by any particular theory, the catalyst used in an ebullating bed reactor typically has lower activity for hydrogenation relative to the typical catalyst used in a slurry hydrocracking reactor. As a result, it is believed that ebullating bed reactors can have an increased tendency to form insoluble compounds. In order to reduce or minimize problems related to compatibility, multiple reactors in series can be used when performing net conversion of 60 wt % or more, or 70 wt % or more, using an ebullating bed reactor. This can allow potentially incompatible compounds to be removed as the intermediate effluent is moved between reactors.

The hydroconversion stage is operated at a net conversion of 60 wt % to 89 wt %, relative to a conversion temperature of 975° F. (524° C.), or 70 wt % to 89 wt %, or 60 wt % to 85 wt %, or 70 wt % to 85 wt %, or 75 wt % to 89 wt %. Optionally but preferably, the hydroconversion stage can correspond to a single reactor, as opposed to having a plurality of reactors arranged in series. This can reduce or minimize the likelihood of incompatibility in aspects where a recycle stream is used as part of the input flow to the hydroconversion stage. It is noted that a plurality of reactors can be used in parallel to provide a desired total capacity for processing an input flow using hydroconversion stages with single reactors. More generally, any convenient combination of reactors in parallel and/or in series can be used. In some aspects, the net conversion can substantially correspond to the per-pass conversion in the reactor. In other aspects, a portion of the pitch or unconverted bottoms from the hydroconversion stage can be recycled. In such aspects, the per-pass conversion can be significantly lower, such as having a per-pass conversion of 60 wt % or less, or 50 wt % or less, or 40 wt % or less, relative to 524° C. or alternatively relative to 566° C. The amount of recycle can correspond to from 50 wt % to 250 wt %, or 60 wt % to 250 wt %, or 50 wt % to 200 wt %, or 60 wt % to 200 wt %, of the flow of fresh vacuum bottoms (and/or other fraction) into the hydroconversion stage. This corresponds to a combined feed ratio of 1.5 to 3.5, or 1.6 to 3.5, or 1.5 to 3.0, or 1.6 to 3.0.

The hydroconverted effluent from the hydroconversion stage can include a variety of fractions, including a hydroconverted naphtha fraction, a hydroconverted distillate fraction, a hydroconverted vacuum gas oil fraction, and a pitch fraction. The hydroconverted distillate fraction, the hydroconverted vacuum gas oil fraction, and the pitch fraction correspond to a 177° C.+ portion of the hydroconverted effluent. In some aspects, the nitrogen content of this 177° C.+ portion of the hydroconverted effluent can be at least 75 wt % of the nitrogen content of the fresh feed into the hydroconversion stage, or at least 90 wt % of the nitrogen content of the fresh feed.

In some aspects, the separation used to form the pitch or unconverted oil fraction from the hydroconversion stage effluent can be configured so that more than 50 wt % of the recycled pitch corresponds to 566° C.+ components, or 60 wt % or more, or 70 wt % or more, such as up to having substantially all of the recycle pitch correspond to 566° C.+ components. Operating with pitch recycle can potentially provide a variety of benefits. In some aspects, by using a pitch recycle stream corresponding to more than 50 wt % of 566° C.+ material while allowing vacuum gas oil to exit after once-through processing, the residence time of heavier components is increased while maintaining a lower residence time for vacuum gas oil in the feed. It is believed that this contributes to forming a hydroconversion effluent that is enriched in vacuum gas oil compounds, as overcracking of the vacuum gas oil compounds is reduced or minimized. In some aspects, without being bound by any particular theory, it is believed that by increasing pitch recycle while maintaining a relatively low net conversion, the amount of aromatic compounds present in the slurry hydroconversion effluent can be increased, resulting in improved solvency for the final processed heavy hydrocarbon product. This can reduce, minimize, or prevent asphaltene precipitation when mixing the hydroconversion effluent with virgin distillate and/or virgin vacuum gas oil fractions, such as when forming a processed heavy hydrocarbon product. This can work in combination with avoiding overcracking of the vacuum gas oil to reduce or minimize the amount of additional naphtha that is needed as a transport diluent.

Still another potential benefit can be achieved by using a combination of a sufficiently heavy feed with a sufficiently high amount of pitch recycle where the pitch recycle is also sufficiently heavy. For example, by using a fresh feed containing 50 wt % or more of 566° C.+ components, a pitch recycle mass flow rate corresponding to 50 wt % to 250 wt % of the fresh feed mass flow rate, and a pitch recycle containing more than 50 wt % 566° C.+ components, an unexpected increase in reactor productivity can be achieved. This can provide additional capacity for processing bitumen (and/or other heavy hydrocarbon feeds) relative to the size of the reactor and/or allow a reactor to operate at higher conversion. Additionally or alternately, by using high pitch recycle to enable additional conversion of 566° C.+ components while reducing or minimizing secondary cracking, the amount of light gas ($C_{4-}$ components) that is generated can be reduced.

In some aspects, the fresh feed to the hydroconversion stage can include 60 wt % or more of 566° C.+ components, or 75 wt % or more, or 90 wt % or more, such as having substantially all of the fresh feed to the hydroconversion stage correspond to 566° C.+ material. This can provide further benefits when attempting to form a partially upgraded heavy hydrocarbon product with an increased vacuum gas oil content. By reducing or minimizing the amount of vacuum gas oil passed into the hydroconversion stage as part of the fresh feed, overcracking of vacuum gas oil products to lower boiling compounds can be reduced or minimized. In aspects where pitch recycle is also used, additional benefits in avoiding overcracking can be achieved by using a pitch recycle stream including more than 50 wt % of 566° C.+ components, or 60 wt % or more, or 70 wt % or more, such as up to having substantially all of the pitch recycle stream correspond to 566° C.+ material.

In various aspects, the amount of pitch passed into a partial oxidation stage for conversion into hydrogen and carbon can correspond to 10 wt % or less of the initial heavy hydrocarbon feed, or 7.5 wt % or less, or 5.0 wt % or less, such as down to 2.0 wt % or possibly still lower.

It has been discovered that by reducing or minimizing the amount of the heavy hydrocarbon feed that is exposed to hydroconversion conditions, and by performing limited conversion during hydroconversion, a hydroconversion product can be produced with desirable properties. For example, the hydroconversion product can be blended together with the remaining, non-hydroconverted portion of the heavy hydrocarbon feed to form a processed heavy hydrocarbon product. Due to the hydroconversion of the bottoms of the heavy hydrocarbon feed under mild hydroconversion conditions, the resulting processed heavy hydrocarbon product can be compatible with pipeline transport standards with addition of little or possibly no additional transport diluent. It is noted that the naphtha boiling range fraction of the hydroconversion effluent can have a similar boiling range to a transport diluent. When the naphtha boiling range fraction from the hydroconversion effluent is added to the blend corresponding to the processed heavy hydrocarbon product, the naphtha from the hydroconversion effluent can correspond to 3.0 wt % to 15 wt % of the weight of the blend, or 5.0 wt % to 15 wt %, or 3.0 wt % to 10 wt %, or 5.0 wt % to 10 wt %. This naphtha boiling range fraction can act in a similar manner to a transport diluent, even though it is part of the hydroconverted product for transport. Thus, even though there may be no added transport diluent, a transport diluent can be present in the final blend based on inclusion of the naphtha boiling range fraction from the hydroconversion effluent. In this discussion, added transport diluent/additional transport diluent is defined as a naphtha boiling range fraction, not derived from the hydroconversion effluent that is added to the processed heavy hydrocarbon product.

In various aspects, the amount of diluent in a processed heavy hydrocarbon product (as described herein) can be 20 wt % or less, or 15 wt % or less, or 10 wt % or less, such as down to 3.0 wt % or possibly still lower. In some aspects, this can correspond to forming a blend (i.e., the processed heavy hydrocarbon product) that includes 10 wt % or less of additional transport diluent, or 5.0 wt % or less, or 3.0 wt % or less, such as down to having substantially no added transport diluent. In this discussion, a processed heavy hydrocarbon product that includes substantially no added transport diluent corresponds to a product that includes less than 1.0 wt % of added transport diluent.

In order to achieve a desired level of diluent in the partially upgraded heavy hydrocarbon product, a sufficient amount of diluent can be removed from the heavy hydrocarbon feed during the initial separation step(s). For example, when upgrading a heavy hydrocarbon feed for transport, substantially all of the naphtha in the feed can correspond to extraction site diluent. An initial boiling point separation can be used to remove such naphtha, so that any distillate and/or vacuum gas oil boiling range fractions for incorporation into the final product blend can have a reduced or minimized content of 177° C.− material. For example, during an initial separation stage, a boiling point separation can be used to form a fresh feed fraction for use as feed to the slurry hydroconversion stage; a diluent fraction including 177° C.− material; and one or more additional fractions containing 177° C.+ material for incorporation into the final blended product. The amount of 177° C.− components in the one or more additional fractions can correspond to 5.0 wt % or less of the one or more additional fractions, or 3.0 wt % or less, or 1.0 wt % or less.

In various aspects, the heavy hydrocarbon product can correspond to a blend that is formed by processing two or more portions of the initial heavy hydrocarbon feed in different manners. For example, in some aspects, prior to fractionation, the heavy hydrocarbon feed can be split into a plurality of portion. In such aspects, at least one of the portions (such as a second portion) can be introduced into the final blend without further processing, while at least a first portion can be exposed to separation and limited hydroconversion (or at least part of the portion). A liquid effluent portion of the hydroconversion products can then be incorporated into the final blend. In other aspects, substantially all of the heavy hydrocarbon feed can be fractionated into a plurality of fractions. In such aspects, at least one lighter fraction can be introduced into the final blend without further processing, while a heavier fraction can be exposed to hydroconversion conditions. A liquid effluent portion of the hydroconversion products can then be incorporated into the final blend. It is noted that the portion of the hydroconversion products that is incorporated into the final blend can optionally (but preferably) correspond to a portion that undergoes further processing. For example, the portion of the hydroconversion products that is incorporated into the final blend can include naphtha and/or distillate portions that are exposed to stabilization (or other hydrotreatment) conditions prior to incorporation into the final blend.

In some aspects, the processed heavy hydrocarbon product can include 40 wt % or more of a 343° C.-566° C. fraction, or 50 wt % or more, or 60 wt % or more, such as up to 70 wt % or possibly still higher. Such aspects can correspond to a processed heavy hydrocarbon product that contains an elevated amount of vacuum gas oil. In some aspects, the processed heavy hydrocarbon product can correspond to a "bottomless" crude. A bottomless crude refers to a crude oil fraction that includes a reduced or minimized amount of vacuum resid boiling range components. For example, a bottomless crude can contain 3.0 wt % or less of 593° C.+ components, or 1.0 wt % or less, such as down to substantially no 593° C.+ components (i.e., 0.1 wt % or less). Additionally or alternately, a bottomless crude can contain 5.0 wt % or less of 566° C.+ components, or 3.0 wt % or less, or 1.0 wt % or less, such as down to substantially no 566° C.+ components.

After forming the final blend, an additional distillation can optionally be performed to reduce the amount of transport diluent. Additionally or alternately, additional transport diluent can optionally be added as the final blend is formed. The processed heavy hydrocarbon product can correspond to this final blend after any optional additional distillation and/or addition of transport diluent.

In some optional aspects, the heavy hydrocarbon feed that is passed into the distillation stage corresponds to a heavy hydrocarbon feed that is formed by processing of oil sands using a froth treatment. The froth treatment can correspond to a paraffinic froth treatment, a naphthenic froth treatment, or another type of froth treatment. It is noted that a heavy hydrocarbon feed can also be generated from oil sands by using steam and/or solvent to enhance extraction from the oil sands.

In some optional aspects, the distillation stage can further include performing deasphalting on the atmospheric resid and/or vacuum resid formed during vacuum distillation. In other optional aspects, deasphalting can be performed on the feed without performing prior fractionation. In such aspects, at least a portion of the input flow to the hydroconversion stage (such as a slurry hydroprocessing stage) can correspond to a rock fraction formed from the deasphalting.

Definitions

In this discussion, unless otherwise specified, "conversion" of a feedstock or other input stream is defined as conversion relative to a conversion temperature of 524° C. (975° F.). Per-pass conversion refers to the amount of conversion that occurs during a single pass through a reactor/stage/reaction system. It is noted that recirculation streams (i.e., streams having substantially the same composition as the liquid in the reactor) are considered as part of the reactor, and therefore are included in the calculation of per-pass conversion. Net or overall conversion refers to the net products from the reactor/stage/reaction system, so that any recycle streams are included in the calculation of the net or overall conversion. It is noted that in all aspects described herein, the amount of conversion at 524° C. is lower than the corresponding conversion at 566° C.

In this discussion, the productivity of a reactor/reaction system is defined based on the feed rate of fresh feed to the reactor/reaction system that is required in order to maintain a target level of net conversion relative to 524° C. at constant temperature. An increase in fresh feed rate while maintaining net conversion at constant temperature corresponds to an increase in productivity for a reactor/reaction system.

In this discussion, primary cracking is defined as cracking of 566° C.+ components in the feed. Secondary cracking refers to any cracking of 566° C.− components.

In this discussion, gas holdup refers to the amount of gas present within the reactor at a given moment in time.

In this discussion, the "combined feed ratio" (or CFR) is defined as a ratio corresponding to (mass flow rate of fresh feed+mass flow rate of recycle stream)/(mass flow rate of fresh feed). Based on this definition, the combined feed ratio when no recycle is used is 1.0. When recycle is present, the relative mass flow rate of the recycle stream as a percentage of the fresh feed can be added to 1.0 to provide the combined feed ratio. Thus, when the mass flow rate of the recycle stream is 10% of the mass flow rate of the fresh feed, the CFR is 1.1. When the mass flow rate of the recycle stream is 50% of the mass flow rate of the fresh feed, the CFR is 1.5. When the mass flow rate of the recycle stream is 100% of the mass flow rate of the fresh feed, the CFR is 2.0.

In this discussion, when describing the amount of a fresh feed stream, recirculation stream, recycle stream, or other stream, the mass flow rate of the stream may also be referred to as a "weight" of the stream.

In this discussion, the Liquid Hourly Space Velocity (LHSV) for a feed or a portion of a feed to a slurry hydrocracking reactor is defined as the volume of feed per hour relative to the volume of the reactor.

In this discussion, a "$C_x$" hydrocarbon refers to a hydrocarbon compound that includes "x" number of carbons in the compound. A stream containing "$C_x$-$C_y$" hydrocarbons refers to a stream composed of one or more hydrocarbon compounds that includes at least "x" carbons and no more than "y" carbons in the compound. It is noted that a stream comprising $C_x$-$C_y$ hydrocarbons may also include other types of hydrocarbons, unless otherwise specified.

In this discussion, "Tx" refers to the temperature at which a weight fraction "x" of a sample can be boiled or distilled. For example, if 40 wt % of a sample has a boiling point of 343° C. or less, the sample can be described as having a T40 distillation point of 343° C. In this discussion, boiling points can be determined by a convenient method based on the boiling range of the sample. This can correspond to ASTM D2887, or for heavier samples ASTM D7169.

In this discussion, references to "fresh feed" to a hydroconversion stage correspond to feedstock that has not been previously passed through the hydroconversion stage. This is in contrast to recycled feed portions that are formed by fractionation and/or other separation of the products from the hydroconversion stage.

In this discussion, two types of diluents are referred to. One type of diluent is an optional extraction site diluent that can be used for transport of a heavy hydrocarbon feed from an extraction site to the hydroconversion site. For example, when the heavy hydrocarbon feed corresponds to a bitumen, an initial froth treatment for forming a bitumen may be performed at the extraction site, while the hydroconversion site may be some distance away. Although a dedicated pipeline may be available for this transport of the heavy hydrocarbon feed from the extraction site to the hydroconversion site, some type of transport standards may need to be achieved. The extraction site diluent used for transport from the extraction site to the hydroconversion site can be removed at the hydroconversion site by any convenient method, such as by distillation. It is noted that if the hydroconversion reaction train is in sufficient proximity to the extraction site, an extraction site diluent may not be required. A second type of diluent is a transport diluent. A transport diluent is a diluent that is incorporated into a processed heavy hydrocarbon product to allow the product to meet transport specifications (such as pipeline specifications). Typical diluents for use as either an extraction site diluent or a transport diluent can include various types of naphtha boiling range fractions. It is noted that naphtha boiling range components formed during hydroconversion are not considered transport diluent under this definition, as naphtha compounds formed during slurry hydroconversion are derived in-situ from the feed rather than being added to the processed heavy hydrocarbon product.

In this discussion, reference is made to "heavy hydrocarbon feed" or "heavy hydrocarbon feedstock, and "initial feed" or "initial feedstock". The heavy hydrocarbon feed corresponds to a heavy hydrocarbon feed as described in the "Feedstocks—General" section below. In order to transport a heavy hydrocarbon feed from an extraction site to the location of the hydroconversion system, an extraction site diluent may be added to the heavy hydrocarbon feed. In some aspects, the extraction site diluent can correspond to a naphtha fraction. In such aspects, the heavy hydrocarbon feed plus the extraction site diluent used to transport the heavy hydrocarbon feed to the hydroconversion system can be referred to as an "initial feed" or "initial feedstock". A separation can be performed to remove some or all of the extraction site diluent prior to further processing of the heavy hydrocarbon fee and/or prior to incorporation of the heavy hydrocarbon feed into the partially upgraded heavy hydrocarbon product. Such a separation performed on an "initial feedstock" can be used to recover a fraction corresponding to extraction site diluent, and a fraction corresponding to the heavy hydrocarbon feed that optionally still contains a remaining portion of the extraction site diluent. In other aspects, the extraction site diluent can include distillate and/or vacuum gas oil boiling range components. Such distillate and/or vacuum gas oil boiling range components of an extraction site diluent can be processed in the same manner as other distillate and/or vacuum gas oil boiling range components It is noted that unless otherwise specified (such as based on boiling range) references to "heavy hydrocarbon feed" do not exclude the possible presence of extraction site diluent.

In various aspects of the invention, reference may be made to one or more types of fractions generated during distillation of a petroleum feedstock, intermediate product, and/or product. Such fractions may include naphtha fractions, distillate fuel fractions, and vacuum gas oil fractions. Each of these types of fractions can be defined based on a boiling range, such as a boiling range that includes at least 90 wt % of the fraction, or at least 95 wt % of the fraction. For example, for naphtha fractions, at least 90 wt % of the fraction, or at least 95 wt %, can have a boiling point in the range of 85° F. (29° C.) to 350° F. (177° C.). It is noted that 29° C. roughly corresponds to the boiling point of isopentane, a $C_5$ hydrocarbon. For a distillate fuel fraction, at least 90 wt % of the fraction, or at least 95 wt %, can have a boiling point in the range of 350° F. (177° C.) to 650° F. (343° C.). For a vacuum gas oil fraction, at least 90 wt % of the fraction, or at least 95 wt %, can have a boiling point in the range of 650° F. (343° C.) to 1050° F. (566° C.). Fractions boiling below the naphtha range can sometimes be referred to as light ends. Fractions boiling above the vacuum gas oil range can be referred to as vacuum resid fractions or pitch fractions.

Another option for specifying various types of boiling ranges can be based on a combination of T5 (or T10) and T95 (or T90) distillation points. For example, in some aspects, having at least 90 wt % of a fraction boil in the naphtha boiling range can correspond to having a T5 distillation point of 29° C. or more and a T95 distillation point of 177° C. or less. In some aspects, having at least 90 wt % of a fraction boil in the distillate boiling range can correspond to having a T5 distillation point of 177° C. or more and a T95 distillation point of 343° C. or less. In some aspects, having at least 90 wt % of a fraction boil in the vacuum gas oil range can correspond to having a T5 distillation point of 343° C. or more and a T95 distillation point of 566° C. or less.

In this discussion, the boiling range of components in a feed, intermediate product, and/or final product may alternatively be described based on describing a weight percentage of components that boil within a defined range. The defined range can correspond to a range with an upper bound, such as components that boil at less than 177° C. (referred to as 177° C.–); a range with a lower bound, such as components that boil at greater than 566° C. (referred to as 566° C.+); or a range with both an upper bound and a lower bound, such as 343° C. — 566° C.

Examples of Configurations

Figure 2:
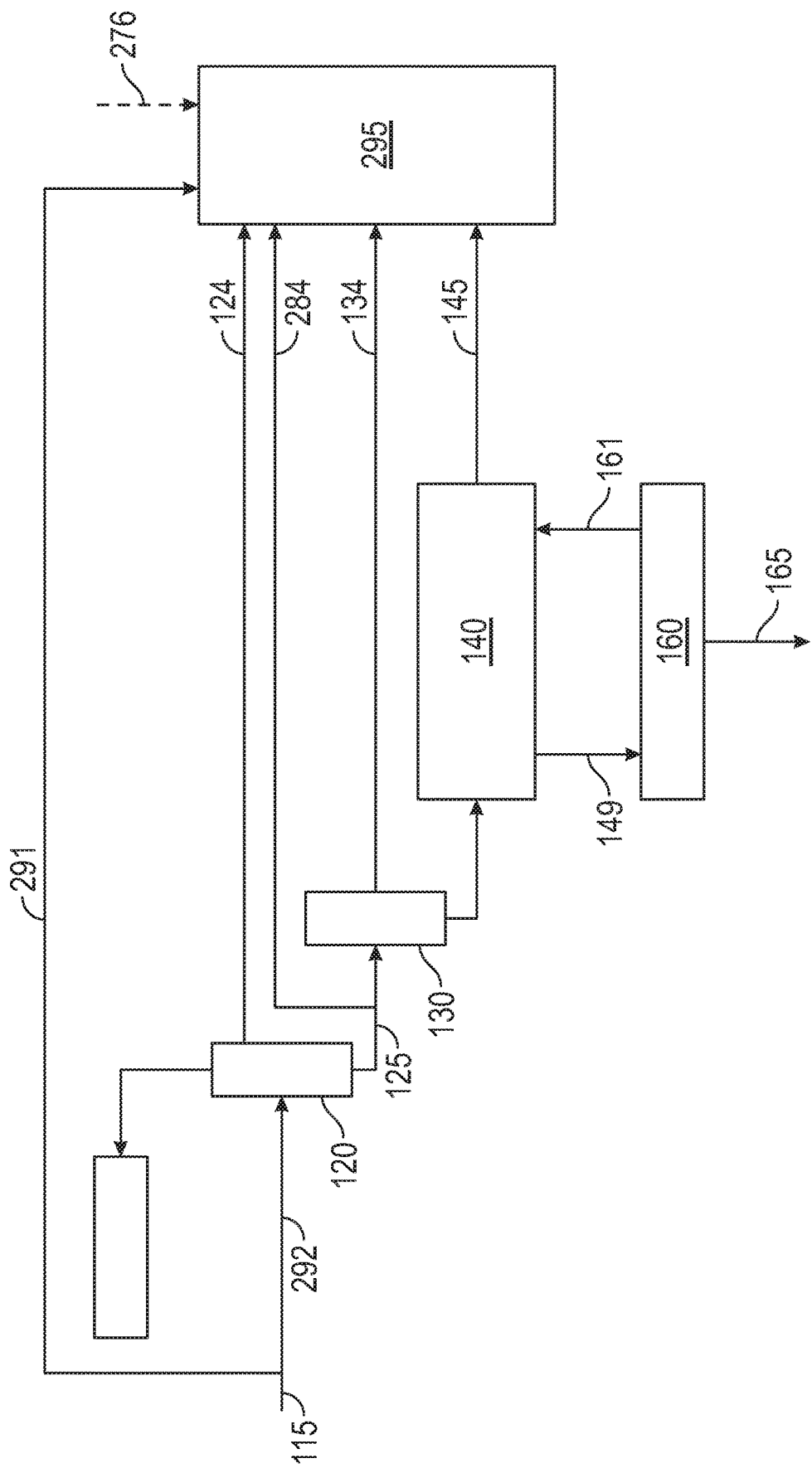
FIG. 2 shows another example of a configuration for upgrading a heavy hydrocarbon feed.
Figure 3:
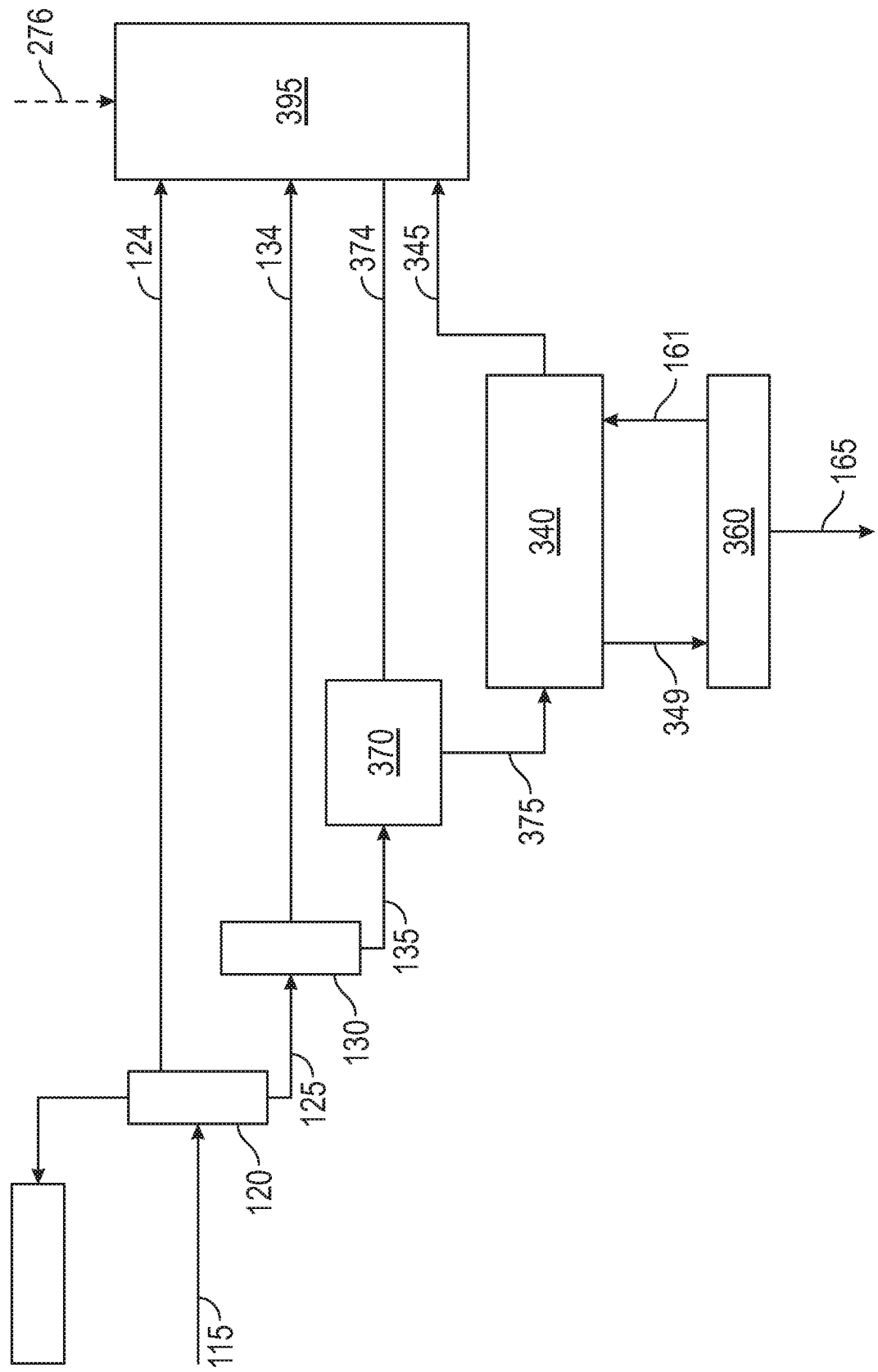
FIG. 3 shows yet another example of a configuration for upgrading a heavy hydrocarbon feed.

A variety of configurations can be used for upgrading a heavy hydrocarbon feed to be suitable for transport. The various configurations can reduce or minimize the amount of feed that requires transport by other methods. This can be accomplished using a combination of an appropriate initial separation followed by hydroconversion with limited conversion. FIGS. 1-3 show examples of several types of configurations suitable for upgrading of a heavy hydrocarbon feed. An initial overview for the various types of configurations is provided in this section, while additional details for the various types of process elements are provided below.

FIG. 1 shows an example of a configuration for upgrading of a heavy hydrocarbon feed while reducing or minimizing the amount of diluent that is included in the final processed heavy hydrocarbon product. In the example shown in FIG. 1, the heavy hydrocarbon feed corresponds to a diluted bitumen generated by a paraffinic froth treatment. For example, a diluted bitumen can be generated by water washing of oil sands to form a froth. The froth can then be exposed to a paraffinic froth treatment to form a bitumen that is mixed with paraffinic solvent. The paraffinic froth treatment also results in formation of a water phase that includes particles, asphaltenes, and other material that is rejected by the paraffinic froth treatment. After separation of the bitumen from the paraffinic solvent, an optional extraction site diluent can be added to the bitumen to form a diluted bitumen. In some aspects, a bitumen produced by paraffin froth treatment can be beneficial due to the vacuum resid portion of the bitumen having a lower tendency to form coke during the hydroconversion process. In other aspects, other types of heavy hydrocarbon feeds can be used, such as feeds generated by naphthenic froth treatment, feeds corresponding to conventional heavy crude oil(s), feeds generated by steam extraction of hydrocarbons from oil sands, and/or other types of heavy hydrocarbon feeds. Generally, any type of heavy hydrocarbon feed can also include an optional extraction site diluent.

A heavy hydrocarbon feed 115, optionally including extraction solvent, can be passed into one or more separation stages. In the example shown in FIG. 1, the heavy hydrocarbon feed 115 is first passed into an atmospheric separator 120. This can be any convenient type of atmospheric separator capable of generating an atmospheric bottoms stream 125. In some aspects, the atmospheric bottoms stream can have a T10 boiling point of 340° C. to 380° C. In other aspects, the atmospheric bottoms stream 125 can have a T10 boiling point in the naphtha boiling range, due to inclusion of a portion of a naphtha boiling range extraction site diluent in the atmospheric bottoms. More generally, the atmospheric bottoms stream can have any convenient T10 boiling point that can achieved by atmospheric separation. The handling of lighter fractions can depend on the nature of the atmospheric separator. If the atmospheric separator 120 is a pipestill or distillation tower, then multiple lighter fractions can be produced. For example, if the extraction site diluent includes a naphtha boiling range portion, the atmospheric separator 120 can generate a first fraction 122 for removal of at least a portion of the extraction site diluent from the diluted bitumen. The first fraction 122 can then be returned, for example, to the extraction site for further use as a diluent for heavy hydrocarbon feed. The atmospheric separator 120 can also generate one or more second fractions 124 that can include distillate boiling range compounds. The second fraction(s) 124 correspond to atmospheric product fractions for eventual inclusion in the final blended product. The second fraction(s) 124 can optionally include a portion of the extraction site diluent. If the separator is a flash separator, a single overhead fraction can be produced that is subsequently separated to recover the extraction site diluent 122 and second fraction 124.

In the example shown in FIG. 1, the atmospheric bottoms 125 are then passed to a vacuum fractionator 130. Vacuum fractionator 130 can generate one or more vacuum gas oil fractions 134 and a vacuum bottoms fraction 135. Optionally, the cut point in the vacuum fractionator 130 can be selected to reduce or minimize the volume of the vacuum bottoms fraction. The vacuum bottoms fraction can include a majority of any particles from the atmospheric bottoms.

In some aspects, atmospheric separator 120 can be optional, so that the diluted bitumen/other heavy hydrocarbon feed optionally mixed with extraction site solvent is passed directly into vacuum fractionator 130. For example, in aspects where the heavy hydrocarbon feed is not mixed with extraction site diluent and/or in aspects where the extraction site diluent includes distillate and/or vacuum gas oil fractions, the heavy hydrocarbon feed may contain a reduced or minimized amount of naphtha boiling range components. While distillate boiling range components could still be separated using an atmospheric separator, it may be desirable to instead separate out the distillate fraction and the vacuum gas oil fraction in the vacuum fractionator.

Figure 4:
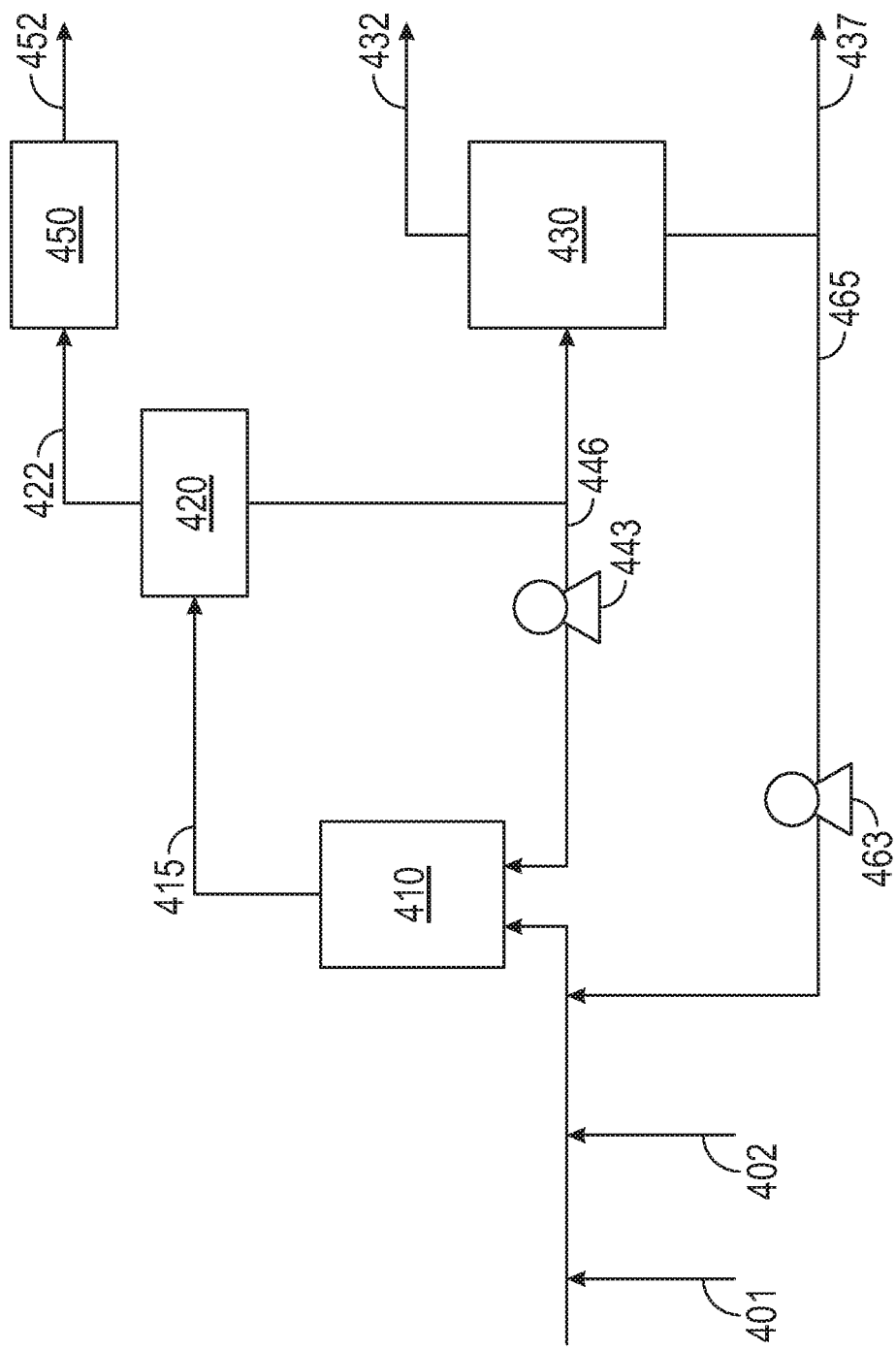
FIG. 4 shows an example of a configuration for a slurry hydroprocessing reactor.

The vacuum bottoms fraction 135 can then be passed into a hydroconversion stage 140. In the example shown in FIG. 1, hydroconversion stage 140 can correspond to a slurry hydroconversion stage, but other types of hydroconversion stages can also be used. An example of a hydroconversion stage is shown in FIG. 4. The hydroconversion stage 140 can generate hydroconverted effluent 145 and pitch or unconverted fraction 149. The hydroconversion effluent 145 can correspond to a combination of naphtha, distillate fuel, and vacuum gas oil boiling range compounds. The hydroconversion stage 140 can also generate a light ends fraction (not shown). Optionally, the hydroconversion stage 140 can include an additional hydrotreater or stabilizer to further reduce olefin content and/or heteroatom content in the hydroconversion effluent 145. In such optional aspects, a portion of second product fraction(s) 124 and/or vacuum gas oil fraction(s) 134 can also be passed into the additional hydrotreater or stabilizer.

In the example shown in FIG. 1, be hydroconversion effluent 145 can then be combined with second fraction(s) 124 (from the atmospheric separator) and vacuum gas oil fraction(s) 134 to form a blended product 195. In some aspects, blended product 195 can include 1.0 wt % or less of diluent, and therefore can be substantially free of diluent. In other aspects, blended product 195 can include a desired amount of transport diluent, such as 1.0 wt % to 20 wt %. In various aspects, before and/or after addition of transport diluent, the blended product can include a kinematic viscosity at 7.5° C. of 360 cSt or less, or 350 cSt or less and an API gravity of 18° or more, or 19° or more, such as an API gravity of 18° to 25°, or 19° to 25°, or 18° to 21°, or 19° to 21°.

The pitch 149 can include substantially all of the particles that exit from hydroconversion stage 140. This can include catalyst particles (such as catalyst particles from slurry hydroconversion), particles retained in the heavy hydrocarbon feed after a froth treatment, and/or coke particles formed during hydroconversion. The pitch 149 can be passed into a partial oxidation reactor 160. By performing partial oxidation on the pitch, hydrogen can be generated to supply hydrogen stream 161 to hydroconversion stage 140. As needed, additional hydrogen can be provided, such as hydrogen from a steam methane reforming unit (not shown). The residue or slag 165 from partial oxidation reactor 160 can then be disposed of in a convenient manner, such as by sending the slag 165 to a metals reclamation stage. In various aspects, the slag 165 from partial oxidation reactor 160 corresponds to the only carbon-containing portion of heavy hydrocarbon feed 115 that requires separate transport.

The configuration shown in FIG. 1 can provide a variety of advantages for upgrading of a heavy hydrocarbon feed. First, by combining hydroconversion effluent 145 with atmospheric product fraction 124 and vacuum gas oil 134, an upgraded product for pipeline transport can be created by hydroprocessing the vacuum resid portion of the initial heavy hydrocarbon feed. This upgraded product can include little or no transport diluent. This can increase the available transport capacity for product crude (since little or no volume is occupied by transport diluent) while also reducing or minimizing the amount of additional transport diluent that needs to be delivered to the extraction site. In some aspects, this upgraded product can also correspond to a bottomless crude, which is a higher value product than the initial heavy hydrocarbon feed.

An additional potential advantage of the configuration shown in FIG. 1 is that some $C_3$ and $C_4$ hydrocarbons generated during slurry hydroprocessing (or another hydroconversion process) can potentially be included in the final blend 195. The amount of $C_3$ and/or $C_4$ hydrocarbons included in final blend 195 is dependent on satisfying the volatility specification for pipeline transport. For any $C_1$ or $C_2$ hydrocarbons generated during hydroconversion, such hydrocarbons can be used as fuel gas.

In some aspects, substantially all of the vacuum bottoms fraction is used as the feed to the hydroconversion reactor. In other aspects, such as the configuration shown in FIG. 1, instead of processing all or substantially all of the vacuum resid under hydroconversion conditions, a portion 175 of the vacuum resid can be used for asphalt production. Optionally, a portion of the vacuum gas oil from the heavy hydrocarbon feed can also be used for asphalt production (not shown). By sending a portion 175 of the vacuum resid to asphalt production, the size of the hydroconversion reactor in hydroconversion stage 140 can be reduced.

In aspects where a bitumen with a reduced asphaltene content is used as at least a portion of the heavy hydrocarbon feed, such as a bitumen derived from a paraffinic froth treatment, the reduced asphaltene content of a bitumen (or other heavy hydrocarbon feed) can potentially limit the quality of an asphalt made from portions of the vacuum resid and/or vacuum gas oil fractions of the bitumen. One option for improving asphalt quality can be to partially oxidize the vacuum resid used for asphalt formation, such as by air blowing. For example, in an asphalt oxidation process, an asphalt feed can be preheated to a temperature from 125° C. to 300° C. The asphalt feed can then be exposed to air (or another convenient source of oxygen) in an oxidizer vessel. An example of a suitable oxidizer vessel can be a countercurrent oxidizer vessel where the air travels upward through and passes through the asphalt feed as it travels downward in the vessel. The air is not only the reactant, but also serves to agitate and mix the asphalt, thereby increasing the surface area and rate of reaction. Oxygen is consumed by the asphalt as the air ascends through the down flowing asphalt. Steam or water can be sprayed into the vapor space above the asphalt to suppress foaming and to dilute the oxygen content of waste gases that are formed during the oxidation process. The oxidizer vessel is typically operated at low pressures of 0 to 2 barg. The temperature of the oxidizer vessel can be from 150° C. to 300° C., or from 200° C. to 270° C., or from 250° C. to 270° C. In some aspects, the temperature within the oxidizer can be at least 10° C. higher than the incoming asphalt feed temperature, or at least 20° C. higher, or at least 30° C. higher. The low pressure off-gas, which is primarily comprised of nitrogen and water vapor, is often conducted to an incinerator where it is burned before being discharged to the atmosphere. After any optional steam generation and/or heat exchange of the hot asphalt product stream, the asphalt product stream can be cooled prior to going to storage. Additionally or alternately, any vacuum gas oil that is desired for incorporation into the asphalt can be mixed with the oxidized vacuum resid after the oxidation process.

In various aspects, a variety of fractions suitable for incorporation into asphalt can be generated during processing of a heavy hydrocarbon feed. Examples of such fractions can include vacuum resid (566° C.+ vacuum resid), deep cut vacuum resid (~580° C.+ vacuum resid), pentane rock, deasphalted oil, 427° C.-482° C. vacuum gas oil, 482° C.-538° C. vacuum gas oil, 510° C.-566° C. vacuum gas oil, and 538° C.-593° C. vacuum gas oil plus vacuum resid, and combinations thereof. It is understood that one or more of the above fractions, such as a plurality of the above fractions, can be used as asphalt components. It is further understood that blending of one or more of such asphalt components, such as a plurality of such asphalt components, can allow for formation of asphalt products with differing properties, depending in part on the proportions used of each asphalt component.

FIG. 2 shows an example of another type of configuration for upgrading a heavy hydrocarbon feed. Many of the process elements in FIG. 2 are similar to FIG. 1, but the overall configuration is different. This difference in the configuration can reduce or minimize the amount of feed that is exposed to separation steps, hydroprocessing, and/or other processing while also reducing or minimizing the volume of product that requires separate transport.

In the configuration shown in FIG. 2, heavy hydrocarbon feed 115 is split into two portions. A second feedstock portion 291 is combined directly into blend 295, without being exposed to any further separation and/or hydroprocessing. The first feedstock portion 292 of the heavy hydrocarbon feed 115 is passed into an atmospheric separation stage, similar to FIG. 1. Optionally, a bypass portion 284 of the atmospheric bottoms 125 can also be combined directly into blend 295 without being exposed to any hydroprocessing. By having the second portion 291 combined into blend 295 without any separation or hydroprocessing, and/or by having the bypass portion 284 combined into blend 295 without any hydroprocessing, several advantages can be realized. First, the size of the separation stages and hydroprocessing stages can be reduced, resulting in lower capital costs. Additionally, by reducing the amount of vacuum bottoms that are passed into hydroconversion stage 140, the amount of pitch 149 can also be reduced, with a corresponding reduction in slag 165 generated by the partial oxidation reactor 160. Thus, the net weight of compounds from the heavy hydrocarbon feed 115 that require separate transport is reduced. In some aspects, this can lead to a corresponding increase in the net liquid product yield.

Similar to the configuration shown in FIG. 1, an asphalt product can be formed using a configuration similar to FIG. 2 by further reducing the amount of vacuum resid passed into the hydroconversion stage 140. Instead of passing all of the vacuum bottoms into hydroconversion stage 140, a portion (not shown) of the vacuum bottoms can be incorporated into an asphalt product (after any optional upgrading, such as oxidation).

It is noted that adding second portion 291 of the heavy hydrocarbon feed directly into blend 295 results in addition of some compounds boiling above the vacuum gas oil range to blend 295. This increases the net amount of 566° C.+ boiling compounds in blend 295. As a result, the amount of transport diluent included in blend 295 can range from 1.0 wt % to 20 wt %, or 1.0 wt % to 10 wt %. If desired, additional transport diluent 276 can be added to blend 295. In various aspects, before and/or after addition of transport diluent, the blended product can include a kinematic viscosity at 7.5° C. of 350 cSt or less and an API gravity of 19° or more, such as an API gravity of 19° to 20°.

An additional consideration for the configuration shown in FIG. 2 is that incorporation of heavy hydrocarbon feed directly into the final product means that particles present in the heavy hydrocarbon feed are also introduced into the final product. In various aspects, when a portion of the heavy hydrocarbon feed is incorporated directly into a processed heavy hydrocarbon product (i.e., the blended product), the particle content of the processed heavy hydrocarbon product can be 0.2 wt % or less, or 0.1 wt % or less, such as down to substantially no particle content. Additionally or alternately, in aspects where heavy hydrocarbon feed is incorporated directly into a processed heavy hydrocarbon product, the particle content of the heavy hydrocarbon feed can be 0.6 wt % or less, or 0.4 wt % or less, such as down to substantially no particle content.

FIG. 3 shows yet another example of a configuration for upgrading a heavy hydrocarbon feed. In the configuration shown in FIG. 3, a different type of strategy is used for deeply cutting into the atmospheric bottoms 125. Rather than passing the vacuum bottoms 135 into the hydroconversion stage 340, the vacuum bottoms are passed into solvent deasphalter 370. The solvent deasphalter 370 generates a deasphalted oil 374 and a deasphalter residue or rock 375. The rock 375 is then passed into hydroconversion stage 340 to form a hydroconverted effluent 345, light ends 342, and pitch 349. By performing deasphalting, the amount of feed passed into the hydroconversion stage 340 (in the form of rock 375) can be reduced. In the configuration shown in FIG. 3, the resulting pitch 349 is passed into partial oxidation reactor 360. Optionally, a portion of rock 375 can be directly passed into partial oxidation reactor 360 (not shown).

As still another variation, the vacuum separation stage 130 can be optional, so that the atmospheric bottoms 125 are passed into solvent deasphalter 370. In yet another variation, the atmospheric separation stage 120 and vacuum separation stage 130 can be optional, so that the input flow to the solvent deasphalter 370 corresponds to heavy hydrocarbon feed or an initial feed without separation of extraction site solvent.

The deasphalted oil 374 from solvent deasphalter 370 becomes one of the components incorporated into blend 395. Optionally, the deasphalted oil 374 can be hydrotreated (not shown) prior to incorporating the deasphalted oil into blend 395. In some aspects, at least some diluent can be included in blend 395. As a result, the amount of diluent included in blend 395 can range from 1.0 wt % to 20 wt %, or 1.0 wt % to 10 wt %. In other aspects, blend 395 can be formed without any additional diluent. In various aspects, either before or after removal/addition of transport diluent, the blended product can include a kinematic viscosity at 7.5° C. of 360 cSt or less, or 350 cSt or less, and an API gravity of 18° or more, or 19° or more.

Feedstocks—General

In various aspects, a heavy hydrocarbon feed can be processed to form a partially upgraded heavy hydrocarbon product. Examples of heavy hydrocarbon feeds include, but are not limited to, heavy crude oils, oils (such as bitumen) from oil sands, and heavy oils derived from coal, and blends of such feeds. In some aspects, heavy hydrocarbon feeds can also include at least a portion corresponding to a heavy refinery fraction, such as distillation residues, heavy oils coming from catalytic treatment (such as heavy cycle slurry oils or main column bottoms from fluid catalytic cracking), and/or thermal tars (such as oils from visbreaking, steam cracking, or similar thermal or non-catalytic processes). Heavy hydrocarbon feeds can be liquid or semi-solid. Such heavy hydrocarbon feeds can include a substantial portion of the feed that boils at 650° F. (343° C.) or higher. For example, the portion of a heavy hydrocarbon feed that boils at less than 650° F. (343° C.) can correspond to 5 wt % to 40 wt % of the feed, or 10 wt % to 30 wt % of the feed, or 5 wt % to 20 wt % of the feed. In such aspects, the heavy hydrocarbon feed can have a T40 distillation point of 343° C. or higher, or a T30 distillation point of 343° C. or higher, or a T20 distillation point of 343° C. or higher. Additionally or alternately, a substantial portion of a heavy hydrocarbon feed can also correspond to compounds with a boiling point of 566° C. or higher. For example, a heavy hydrocarbon feed can have a T80 distillation point of 566° C. or higher, or a T70 distillation point of 566° C. or higher, or a T60 distillation point of 566° C. or higher, or a T50 distillation point of 566° C. or higher.

Density, or weight per volume, of the heavy hydrocarbon can be determined according to ASTM D287-92 (2006) Standard Test Method for API Gravity of Crude Petroleum and Petroleum Products (Hydrometer Method), and is provided in terms of API gravity. In general, the higher the API gravity, the less dense the oil. API gravity can be 16° or less, or 12° or less, or 8° or less.

Heavy hydrocarbon feeds can be high in metals. For example, the heavy hydrocarbon feed can be high in total nickel, vanadium and iron contents. In one embodiment, the heavy oil will contain at least 0.00005 grams of Ni/V/Fe (50 ppm) or at least 0.0002 grams of Ni/V/Fe (200 ppm) per gram of heavy oil, on a total elemental basis of nickel, vanadium and iron. In other aspects, the heavy oil can contain at least about 500 wppm of nickel, vanadium, and iron, such as at least about 1000 wppm.

Contaminants such as nitrogen and sulfur are typically found in heavy hydrocarbon feeds, often in organically-bound form. Nitrogen content can range from about 0.1 wt % to about 3.0 wt % elemental nitrogen, or 1.0 wt % to 3.0 wt %, or 0.1 wt % to 1.0 wt %, based on total weight of the heavy hydrocarbon feed. The nitrogen containing compounds can be present as basic or non-basic nitrogen species. Examples of basic nitrogen species include quinolines and substituted quinolines. Examples of non-basic nitrogen species include carbazoles and substituted carbazoles.

The invention is particularly suited to treating heavy oil feedstocks containing at least 0.1 wt % sulfur, based on total weight of the heavy hydrocarbon feed. Generally, the sulfur content can range from 0.1 wt % to 10 wt % elemental sulfur, or 1.0 wt % to 10 wt %, or 0.1 wt % to 5.0 wt %, or 1.0 wt % to 7.0 wt %, based on total weight of the heavy hydrocarbon feed. Sulfur will usually be present as organically bound sulfur. Examples of such sulfur compounds include the class of heterocyclic sulfur compounds such as thiophenes, tetrahydrothiophenes, benzothiophenes and their higher homologs and analogs. Other organically bound sulfur compounds include aliphatic, naphthenic, and aromatic mercaptans, sulfides, and di- and polysulfides. In some aspects involving slurry hydroconversion as the hydroconversion stage, higher sulfur feeds can be preferred, as carbon-sulfur bonds can tend to be the first to break under slurry hydroconversion conditions.

Heavy hydrocarbon feeds can be high in n-heptane asphaltenes. In some aspects, the heavy hydrocarbon feed can contain 5 wt % to 80 wt % of n-heptane asphaltenes, or 5 wt % to 60 wt %, or 5 wt % to 50 wt %, or 20 wt % to 80 wt %, or 10 wt % to 50 wt %, or 20 wt % to 60 wt %. In aspects where the heavy hydrocarbon feed includes a portion of a bitumen formed by conventional paraffinic froth treatment of oil sands, the heavy hydrocarbon feed can contain 10 wt % to 30 wt % of asphaltenes.

Still another method for characterizing a heavy hydrocarbon feed is based on the Conradson carbon residue of the feedstock, or alternatively the micro carbon residue content. The Conradson carbon residue/micro carbon residue content of the feedstock can be 5.0 wt % to 50 wt %, or 5.0 wt % to 30 wt %, or 10 wt % to 40 wt %, or 20 wt % to 50 wt %.

In various aspects, one type of upstream handling of a heavy hydrocarbon feed can correspond to addition of an extraction site diluent to form an initial feed. Adding diluent at the extraction site and/or froth treatment site can facilitate transport of the initial feed to the location of the reaction system for forming the partially processed heavy hydrocarbon product. The amount of extraction site diluent present in the initial feed can vary depending on a variety of factors. One consideration can be the amount of extraction site diluent that is needed to transport the initial feed from the extraction site (optionally including a froth treatment site) to the location of the hydroconversion process. A second consideration can be the amount of transport diluent that is desired in the final blended product, to facilitate transport of the final blended product from the location of the reaction system to a destination (such as a refinery) for the final blended product.

In some aspects, the amount of extraction site diluent present in the initial feed can be greater than the amount of transport diluent desired in the final blended product. In such aspects, an initial separation can be performed on the initial feed to remove at least a portion of the extraction site diluent, so that the amount of extraction site diluent remaining with the heavy hydrocarbon feed after the initial separation is roughly less than or equal to the target amount of transport diluent for the final blended product. In other aspects, the target amount of transport diluent may be greater than the amount of extraction site diluent that is needed to move the initial feed from the extraction site to the location of the reaction system. For example, if a dedicated pipeline is available for moving feed from the extraction site to the location of the reaction system, it may be feasible to operate such a pipeline at a higher target kinematic viscosity and/or a low target API gravity, so that a reduced or minimized amount of diluent is needed to move the initial feed to the location of the reaction system. In such aspects, the amount of extraction site diluent can be reduced to any convenient level, such as including no extraction site diluent. This can reduce or minimize the need to perform an atmospheric separation, or can alternatively simplify the atmospheric separation, as the atmospheric overhead will contain a reduced or minimized amount of diluent, such as possibly no diluent. Alternatively, it may be more convenient to increase the amount of extraction site diluent to match the target amount of transport diluent. For example, adding sufficient extraction site diluent to also satisfy the target amount of transport diluent could avoid the need to have a diluent blending facility at both the extraction site and at the location of the reaction system.

In aspects where all of the heavy hydrocarbon feed is processed in the reaction system, the amount of transport diluent that is needed in the final blended product can be reduced or minimized. This is due in part to the reduced API gravity and/or reduced viscosity of the hydroconverted effluent. For example, by performing hydroconversion on a resid portion of the heavy hydrocarbon feed, a hydroconverted effluent can be formed with a substantially increased API gravity and/or substantially reduced kinematic viscosity. This results in a final blended product with an increased API gravity and/or reduced kinematic viscosity. In some aspects, the hydroconverted effluent can increase the API gravity of the final blended product by a sufficient amount so that substantially no transport diluent is needed to achieve a desired pipeline specification and/or other transport specification. In other aspects, a reduced or minimized amount of transport diluent can be needed.

In other aspects, the heavy hydrocarbon feed can be split so that a bypass portion of the heavy hydrocarbon feed is introduced into the final blended product without further processing. In such aspects, a first portion of the heavy hydrocarbon feed is processed in the reaction system (i.e., separated to allow a resid fraction to be exposed to hydroconversion conditions). In such aspects, due to the presence of the bypass fraction, at least some transport diluent may be present in the final blended product. However, combining the hydroconverted effluent with the bypass portion can allow for an unexpectedly large reduction in the amount of transport diluent that is needed. For example, the first portion of the heavy hydrocarbon feed can be separated to form a distillate and vacuum gas oil fraction that is not hydroconverted, and a resid fraction that is exposed to hydroconversion conditions to form a hydroconverted effluent. The hydroconverted effluent can then be combined with the distillate and vacuum gas oil fraction that is not hydroconverted. In some aspects, this intermediate blend can have an API gravity that is greater than the target API gravity for the final blended product. In such aspects, additional extraction site diluent can be removed from the bypass portion while still achieving the desired transport standard. Alternatively, in aspects where the amount of transport diluent is greater than the amount of extraction site diluent, the amount of excess extraction site diluent can be reduced.

Feedstocks—Feeds with Increased Particle Content

In addition to the above properties, another consideration for a heavy hydrocarbon feedstock is the particle content. For crude oils derived from conventional extraction sites, the particle content of the crude oil is typically low. However, an increasing proportion of crude oil production corresponds to non-traditional crudes, such as crude oils derived from oil sands. Initial extraction of non-traditional crudes can present some additional challenges. For example, during mining or extraction of oil sands, a large percentage of non-petroleum material (such as sand) is typically included in the raw product.

The particle content and/or content of other non-petroleum materials of oil sands can be quite large, corresponding to 30 wt % or more of the product. An initial reduction in the particle content can be performed by first mixing the raw product with water. Air is typically bubbled through the water to assist in separating the bitumen from the non-petroleum material. This will remove a large proportion of the solid, non-petroleum material in the raw product. However, smaller particles of non-petroleum particulate solids will typically remain with the oil phase at the top of the mixture. This top oil phase is sometimes referred to as a froth. The particles in this froth can still correspond to 5.0 wt % or more of the froth, or 10 wt % or more, such as up to 20 wt % or possibly still higher.

Separation of the smaller non-petroleum particulate solids can be achieved by adding an extraction solvent to the froth of the aqueous mixture. This is referred to as a froth treatment. Examples of froth treatments include paraffinic froth treatment (PFT) and naphthenic froth treatment (NFT).

For paraffinic froth treatment, typical solvents include isopentane, pentane, and other light paraffins (such as $C_5$-$C_8$ paraffins) that are liquids at room temperature. Other solvents such as $C_3$-$C_{10}$ alkanes might also be suitable for use as an extraction solvent for forming an asphaltene-depleted crude, depending on the conditions during the paraffinic froth treatment. For naphthenic froth treatment, a mixture of naphtha boiling range compounds can be used, where the mixture includes aromatics, naphthenes, and optionally paraffins. It is noted that the extraction solvents for paraffinic froth treatment roughly correspond to naphtha boiling range compounds as well, so that the difference between the solvents for PFT and NFT is based on compound class (aromatic, naphthene, paraffin) rather than boiling range.

During a froth treatment, adding the extraction solvent to the froth results in a two phase mixture, with the crude and the extraction solvent forming one of the phases. The smaller particulate solids of non-petroleum material are "rejected" from the oil phase and join the aqueous phase. The crude oil and solvent phase can then be separated from the aqueous phase. During conventional paraffinic froth treatment, after separation from the aqueous phase, the resulting bitumen can have a combined water and particle content of 1.0 wt % or less. Higher particle contents can be present in bitumen formed using naphthenic froth treatment.

When a paraffinic froth treatment is performed under conventional conditions, the paraffinic froth treatment can also impact the amount of asphaltenes that are retained in the bitumen product. When a paraffinic extraction solvent is added to the mixture of raw product and water, between about 30 and 60 percent of the n-heptane asphaltenes in the crude oil are typically "rejected" and lost to the water phase along with the smaller non-petroleum particulate solids. As a result, the bitumen that is separated out from the non-petroleum material after a paraffinic froth treatment corresponds to an asphaltene-depleted crude oil. By using the paraffinic froth treatment to knock out small particulate solids, the asphaltene content of the crude can be reduced or depleted by at least about 30 wt %, such as at least about 40 wt %, or at least about 45 wt %. In other words, the asphaltene-depleted crude will have about 30 wt % less asphaltenes than the corresponding raw crude, such as at least about 40 wt %, or at least about 45 wt %. Typically, the paraffinic froth treatment will reduce or deplete the asphaltenes in the crude by about 60 wt % or less, such as about 55 wt % or less, or about 50 wt % or less. The amount of asphaltenes that are removed or depleted can depend on a variety of factors. Possible factors that can influence the amount of asphaltene depletion include the nature of the extraction solvent, the amount of extraction solvent relative to the amount of crude oil, the temperature during the paraffinic froth treatment process, and the nature of the raw crude being exposed to the paraffinic froth treatment.

In some aspects where a slurry hydroprocessing reactor is used as the hydroconversion stage, the increased amount of particles can serve as additional catalyst in the slurry hydroprocessing reactor.

Fractionation and Deasphalting

In various aspects, the first step in processing a heavy hydrocarbon feed can be to fractionate at least a portion of the feed. The fractionation stage can include components for performing both an atmospheric distillation and a vacuum distillation (such as an atmospheric tower and a vacuum tower). Optionally, the fractionation stage can further include a deasphalting unit.

A first option for the fractionation stage is to determine the portion of the heavy hydrocarbon feed that is fractionated. In some aspects, substantially all of the heavy hydrocarbon feed can be fractionated. In other aspects, the heavy hydrocarbon feed can be divided so that only a portion is exposed to fractionation. In such aspects, the portion exposed to fractionation can correspond to 5 to 95 wt % of the heavy hydrocarbon feed, or 15 wt % to 95 wt %, or 20 wt % to 95 wt %, or 5 wt % to 80 wt %, or 15 wt % to 80 wt %, or 20 wt % to 80 wt %, or 30 wt % to 95 wt %, or 30 wt % to 80 wt %, or 30 wt % to 70 wt %, or 40 wt % to 95 wt %, or 40 wt % to 80 wt %, or 40 wt % to 70 wt %, or 30 wt % to 50 wt %, or 50 wt % to 70 wt %. The remaining portion of the feed can be blended with one or more fractionated portions and/or hydroconverted effluent portions to form a final blend.

After determining the portion of the heavy hydrocarbon feed to fractionate, the heavy hydrocarbon feed can undergo an atmospheric distillation or separation. In some aspects, this can correspond to fractionation in an atmospheric distillation tower. In other aspects, a flash separation could be performed, or another convenient type of separation. The atmospheric separation can form at least one naphtha and/or distillate fuel boiling range fraction, and a bottoms fraction with a T10 distillation point of 343° C. or more, or 371° C. or more.

The bottoms fraction from the atmospheric separation can then be passed to a vacuum distillation tower to form at least one vacuum gas oil fraction and a vacuum resid fraction. In some aspects, the vacuum distillation tower can be operated with a conventional cut point for forming the vacuum resid fraction, such as forming a vacuum resid fraction with a T10 distillation point of 975° F. (524° C.) to 1050° F. (566° C.). In other aspects, the vacuum distillation can be operated to cut more deeply, so that the T10 distillation point of the vacuum resid is 1050° F. (566° C.) or higher, or 575° C. or higher, or 585° C. or higher, such as up to 600° C. or possibly still higher. Increasing the cut point for the vacuum resid can reduce the volume of resid that is subsequently passed into the hydroconversion stage. In some aspects, the cut point for the vacuum distillation can be selected so that the fraction passed into the hydroconversion stage corresponds to 50 wt % or less of the portion of the heavy hydrocarbon feed that is passed into the stages for separation based on boiling point, or 45 wt % or less, or 40 wt % or less, or 35 wt % or less, such as down to 30 wt % or possibly still lower. In some optional aspects, a portion of the vacuum resid can be passed instead into a partial oxidation reactor to assist with hydrogen generation for the hydroconversion stage.

In some aspects where a higher cut point is used for forming the vacuum resid, the percentage of the vacuum resid that boils at 566° C. or higher can correspond to 50 wt % or more of the vacuum resid fraction, or 60 wt % or more, or 80 wt % or more, or 90 wt % or more, such as up to having substantially all of the vacuum resid fraction correspond to 566° C.+ components. Additionally or alternatively, the percentage of the vacuum resid that boils at 524° C. or more can correspond to 90 wt % or more of the vacuum resid fraction, or 95 wt % or more, such as up to having substantially all of the vacuum resid fraction correspond to 524° C.+ components.

A full range vacuum gas oil can include the final overhead or "distillate" cut that is produced from a vacuum distillation tower. When performing a vacuum distillation, the quality of the separation at the final cut point between the "distillate" and the vacuum tower bottoms can be more difficult to control. Due to the properties of 538° C.+ petroleum fractions, or 566° C.+ petroleum fractions, the final "distillate" cut of vacuum gas oil can typically included 5.0 wt % to 10 wt % of components that have a boiling range of 1000° F. (538° C.) to 1200° F. (649° C.), or 1000° F. (538° C.) to 1150° F. (621° C.). Additionally or alternately, the final "distillate" cut can include 1.0 wt % to 6.0 wt % of components having a boiling range of 1050° F. (566° C.) to 1200° F. (649° C.), or 1050° F. (566° C.) to 1150° F. (621° C.), or 1050° F. (566° C.) to 1100° F. (593° C.). These higher boiling components can become entrained in the vapor that is formed in the reboiler for the vacuum tower, resulting in exit of such higher boiling components as part of the vacuum gas oil. These components represent the highest boiling components that can exit the vacuum tower as part of a distillate cut.

Due to the above difficulties with separating the final distillate cut from the vacuum tower bottoms, a final blended product (or heavy hydrocarbon product) as described herein can include a limited amount of components with a distillation point between 566° C. and 621° C., or between 566° C. and 593° C. Such high boiling components can be included in the heavy hydrocarbon product due to being present in either the virgin vacuum gas oil or the hydroconverted gas oil that is blended together to make the heavy hydrocarbon product. However, based on the exclusion of vacuum resid or unconverted oil in the heavy hydrocarbon product, the amount of components having a distillation point of 621° C. or more, or 593° C. or more, can be limited, as such components are not as susceptible to being entrained as part of a vacuum distillate fraction. Depending on the aspect, the heavy hydrocarbon product can include 0.1 wt % or less (or 0.05 wt % or less) of 649° C.+ components, or 0.1 wt % or less (or 0.05 wt % or less) of 621° C.+ components, or 0.1 wt % or less (or 0.05 wt % or less) of 593° C.+ components. This corresponds to including substantially 649° C.+ components, or substantially no 621° C.+ components, or substantially no 593° C.+ components.

In some aspects, an additional reduction in the volume of the input stream to hydroconversion can be achieved by deasphalting the vacuum resid fraction. The deasphalting can be operated at high lift conditions, so that 40 wt % or more of the input stream becomes deasphalted oil, or 50 wt % or more, or 60 wt % or more, such as up to 75 wt % or possibly still higher. The deasphalter residue or rock can correspond to the remainder of the deasphalter output. The rock can be passed into the hydroconversion stage. Alternatively, a portion of the rock can be passed instead into a partial oxidation reactor to assist with hydrogen generation for the hydroconversion stage.

Other variations for fractionation of a feed can also be used. In some aspects, instead of deasphalting a vacuum bottoms fraction, deasphalting can be performed on a fraction with a broader boiling range, such as performing deasphalting on the heavy hydrocarbon feedstock or on an atmospheric bottoms fraction derived from the heavy hydrocarbon feedstock. Although this increases the volume of feed that is processed by deasphalting, such configurations can remove the need for performing vacuum fractionation. Still another alternative can be to fractionate the heavy hydrocarbon feedstock in a vacuum fractionator without performing a prior atmospheric fractionation. This type of configuration can be beneficial, for example, in configurations where the hydroconversion reaction system is sufficiently close to the extraction site that an extraction site diluent does not need to be added to the heavy hydrocarbon feed.

Example of Hydroconversion Conditions—Slurry Hydroprocessing Conditions

Slurry hydroprocessing is an example of a type of hydroconversion that can be performed under limited severity conditions and that can also allow for withdrawal and addition of catalyst during operation of the hydroconversion process. In a reaction system, slurry hydroprocessing can be performed by processing a feed in one or more slurry hydroprocessing reactors. In some aspects, the slurry hydroprocessing can be performed in a single reactor, or in a group of parallel single reactors. The reaction conditions in a slurry hydroconversion reactor can vary based on the nature of the catalyst, the nature of the feed, the desired products, and/or the desired amount of conversion.

With regard to catalyst, several options are available. In some aspects, the catalyst can correspond to one or more catalytically active metals in particulate form and/or supported on particles. In other aspects, the catalyst can correspond to particulates that are retained within the heavy hydrocarbon feed after using a froth treatment to form the feed. In still other aspects, a mixture of catalytically active metals and particulates retained in the heavy hydrocarbon feed can be used.

In aspects where a catalytically active metal is used as the catalyst, suitable catalyst concentrations can range from about 50 wppm to about 50,000 wppm (or roughly 5.0 wt %), depending on the nature of the catalyst. Catalyst can be incorporated into a hydrocarbon feedstock directly, or the catalyst can be incorporated into a side or slip stream of feed and then combined with the main flow of feedstock. Still another option is to form catalyst in-situ by introducing a catalyst precursor into a feed (or a side/slip stream of feed) and forming catalyst by a subsequent reaction.

Catalytically active metals for use in hydroprocessing can include those from Groups 4-10 of the IUPAC Periodic Table. Examples of suitable metals include iron, nickel, molybdenum, vanadium, tungsten, cobalt, ruthenium, and mixtures thereof. The catalytically active metal may be present as a solid particulate in elemental form or as an organic compound or an inorganic compound such as a sulfide (e.g., molybdenum sulfide) or other ionic compound. Metal or metal compound nanoaggregates may also be used to form the solid particulates.

A catalyst in the form of a solid particulate is generally a compound of a catalytically active metal, or a metal in elemental form, either alone or supported on a refractory material such as an inorganic metal oxide (e.g., alumina, silica, titania, zirconia, and mixtures thereof). Other suitable refractory materials can include carbon, coal, and clays. Zeolites and non-zeolitic molecular sieves are also useful as solid supports. One advantage of using a support is its ability to act as a "coke getter" or adsorbent of asphaltene precursors that might otherwise lead to fouling of process equipment.

In some aspects, it can be desirable to form catalyst for slurry hydroprocessing in situ, such as forming catalyst from a metal sulfate catalyst precursor or another type of catalyst precursor that decomposes or reacts in the hydroconversion reaction zone environment, or in a pretreatment step, to form a desired, well-dispersed and catalytically active solid particulate. Precursors also include oil-soluble organometallic compounds containing the catalytically active metal of interest that thermally decompose to form the solid particulate having catalytic activity. Other suitable precursors include metal oxides that may be converted to catalytically active (or more catalytically active) compounds such as metal sulfides.

In a particular embodiment, a metal oxide containing mineral may be used as a precursor of a solid particulate comprising the catalytically active metal on an inorganic refractory metal oxide support (e.g., alumina).

In some aspects, the hydroconversion reactor can be configured to use particles present in the input flow to the reactor as at least a portion of the catalyst. For example, when the hydroconversion reactor corresponds to a slurry hydroprocessing reactor, substantially all of the catalyst used in the reactor can correspond to catalyst particles that are included in the input flow to the reactor and/or catalyst particles that are created in-situ within the reactor. In such aspects, one option can be to use particulates from the extraction source as at least a portion of the catalyst. In such aspects where particulates from the extraction source for the heavy hydrocarbon feed are used as at least a portion of the catalyst, suitable catalyst concentrations in the input flow to the slurry hydroprocessing reactor can range from 1.0 wt % to 10 wt %, or 2.0 wt % to 10 wt %, or 3.0 wt % to 10 wt %.

The slurry hydroprocessing stage can be operated at a net conversion of 60 wt % to 89 wt %, relative to a conversion temperature of 524° C., or 70 wt % to 89 wt %, or 60 wt % to 85 wt %, or 70 wt % to 85 wt %, or 75 wt % to 89 wt %. Optionally but preferably, the slurry hydroprocessing stage can correspond to a single slurry hydroprocessing reactor, as opposed to having a plurality of reactors arranged in series. In some aspects, the net conversion can substantially correspond to the per-pass conversion in the slurry hydroprocessing reactor. In other aspects, a portion of the pitch or unconverted bottoms from the slurry hydroprocessing reactor can be recycled. In such aspects, the per-pass conversion can be significantly lower, such as having a per-pass conversion of 60 wt % or less, or 50 wt % or less, or 40 wt % or less, relative to 524° C. or alternatively relative to 566° C.

It is noted that reducing or minimizing the amount of vacuum gas oil that is exposed to hydroconversion while operating with pitch recycle can generate a product with increased vacuum gas oil content and reduced or minimized content of 1050° F.+ (566° C.+) components. This can provide benefits in later processing. For example, it is believed that reducing or minimizing the 566° C.+ content in the processed heavy hydrocarbon product can reduce or minimize production of main column bottoms if the resulting processed heavy hydrocarbon product is used as a feed for fluid catalytic cracking.

In addition to operating at reduced conversion, the slurry hydroprocessing reactor can also perform a relatively low level of hydrodesulfurization and/or hydrodenitrogenation. In various aspects, the amount of nitrogen removal (conversion to $NH_3$ or other light end nitrogen compounds) can correspond to 35 wt % or less of the organic nitrogen in the feed to the slurry hydroprocessing reactor, or 30 wt % or less, or 25 wt % or less, such as down to 10 wt % or possibly still lower. Additionally or alternatively, the amount of sulfur removal (conversion to $H_2S$ or other light end sulfur compounds) can correspond to 90 wt % or less of the sulfur in the feed to the slurry hydroprocessing reactor, or 85 wt % or less, or 80 wt % or less, such as down to 60 wt % or possibly still lower. For example, the amount of sulfur removal can correspond to 60 wt % to 90 wt %, or 70 wt % to 85 wt %.

In some aspects where a portion of the slurry hydroprocessing pitch is recycled, the per-pass conversion level for the slurry hydroprocessing reactor can be selected so that the pitch or bottoms fraction provides a sufficient amount of recycle. The amount of recycle can correspond to from 10 wt % to 250 wt % (or 50 wt % to 250 wt %) of the flow of fresh vacuum bottoms into the slurry hydroprocessing reactor. Optionally, the separation of the products from the slurry hydroprocessing reactor can be selected so that more than 50 wt % of the recycled pitch corresponds to 566° C.+ components, or 60 wt % or more, or 90 wt % or more. Thus, the conversion level during a single pass and the subsequent separation of the reaction products can be selected so that a) a sufficient amount of recycled pitch is available, and b) the net conversion corresponds to a target conversion of less than 90 wt % relative to 524° C. In some aspects, it has been discovered that operating with pitch recycle and/or increased pitch recycle can reduce or minimize the amount of diluent required in processed heavy hydrocarbon product. Without being bound by any particular theory, it is believed that increasing pitch recycle while maintaining a relatively low net conversion, the amount of aromatic compounds present in the slurry hydroconversion effluent can be increased, resulting in improved solvency for the final processed heavy hydrocarbon product. This can reduce or minimize the amount of additional naphtha (or other diluent) that is needed to allow the processed heavy hydrocarbon product to be suitable for pipeline transport.

An alternative way of expressing the amount of recycled pitch versus fresh vacuum bottoms can be based on a "recycled pitch ratio". The recycled pitch ratio can also be referred to as a combined feed ratio. In this discussion, the combined feed ratio is defined, on a mass basis, as the combined amount of fresh vacuum bottoms (or alternatively deasphalter rock) plus recycled pitch, divided by the amount of fresh vacuum bottoms (or alternatively deasphalter rock). Based on this definition, the combined feed ratio has a value of 1.0 when there is no recycle. The value of the ratio increases as more pitch is recycled. When the amount of recycled pitch is equal to the amount of fresh vacuum bottoms the combined feed ratio is 2.0. The advantage of this definition for the combined feed ratio is that it is easy to understand the flow rate into the slurry hydroprocessing reactor. A ratio of 1.0 means that the reactor is sized/operated to receive only fresh feed. A ratio of 2.0 means that the reactor needs to be able to handle a feed volume that is twice the rate of fresh feed. In aspects where pitch is recycled for combination with the fresh vacuum bottoms (or alternatively deasphalter rock), the combined feed ratio can range from 1.1 to 3.5, or 1.1 to 3.0, or 1.5 to 3.5, or 1.5 to 3.0, or 1.1 to 2.5, or 1.5 to 2.5.

The reaction conditions within a slurry hydroprocessing reactor that correspond to a selected conversion amount can include a temperature of 400° C. to 480° C., such as 425° C. or more, or 450° C. or more. Some types of slurry hydroprocessing reactors are operated under high hydrogen partial pressure conditions, such as having a hydrogen partial pressure of 1000 psig (6.39 MPag) to 3400 psig (23.4 MPag), for example at least 1200 psig (8.3 MPag), or at least about 1500 psig (10.3 MPag). Examples of hydrogen partial pressures can be 1000 psig (6.9 MPag) to 3000 psig (20.7 MPag), or 1000 psig (8.3 MPag) to 2500 psig (17.2 MPag), or 1500 psig (10.3 MPag) to 3400 psig (23.4 MPag), or 1000 psig (6.9 MPag) to 2000 psig (13.8 MPag), or 1200 psig (8.3 MPag) to 2500 psig (17.2 MPag). Since the catalyst is in slurry form within the feedstock, the space velocity for a slurry hydroconversion reactor can be characterized based on the volume of feed processed relative to the volume of the reactor used for processing the feed. Suitable space velocities for slurry hydroconversion can range, for example, from about 0.05 v/v/hr$^{-1}$ to about 5 v/v/hr$^{-1}$, such as about 0.1 v/v/hr$^{-1}$ to about 2 v/v/hr$^{-1}$.

In some aspects, the quality of the hydrogen stream used for slurry hydroprocessing can be relatively low. For example, in aspects where the catalyst is concentrated into the pitch and removed from the system as part of a product from a partial oxidation reactor, catalyst lifetime can be of minimal concern. This is due to the constant addition of fresh catalyst, whether in the form of particulates from the heavy hydrocarbon feed or in the form of a separately added catalyst. As a result, reaction conditions that conventionally are considered undesirable for hydroprocessing due to catalyst deactivation can potentially be used. This can potentially provide unexpected synergies when a partial oxidation reactor is used to provide at least a portion of the hydrogen for the hydroconversion process.

One example of a reaction condition that is avoided in conventional hydroprocessing is use of hydrogen streams that have relatively high concentrations of known catalyst poisons. Some catalyst poisons can correspond to catalyst poisons commonly found in recycled hydrogen treat gas streams, such as $H_2S$, $NH_3$, CO, and other contaminants. Other catalyst poisons can correspond to contaminants that may be present in hydrogen derived from processing of pitch in a partial oxidation reactor, such as nitrogen oxides (NOx), sulfur oxides (SOx), arsenic compounds, and/or boron compounds. In order to use hydrogen generated by partial oxidation of pitch in a conventional hydroprocessing reactor, various cleanup processes would be needed to reduce or minimize the content of various contaminants in the hydrogen treat gas. However, using a partial oxidation reactor to provide hydrogen for a slurry hydroprocessing reactor can provide the unexpected synergy of allowing at least some cleanup steps to be avoided, due to the tolerance of the slurry hydroprocessing reaction conditions for the presence of various contaminants.

In some aspects, the $H_2$ content of the hydrogen-containing stream introduced into the slurry hydroprocessing reactor can be 90 vol % or less, or 80 vol % or less, or 60 vol % or less, such as down to 40 vol % or possibly still lower. In other aspects, the $H_2$ content of the hydrogen-containing stream can be 80 vol % or more, or 90 vol % or more. For example, the hydrogen-containing stream can contain 80 vol % to 100 vol % $H_2$, or 90 vol % to 100 vol %, or 80 vol % to 98 vol %, or 90 vol % to 98 vol %, or 80 vol % to 96 vol %, or 90 vol % to 96 vol %. Additionally or alternately, the combined content of $H_2S$, CO, and $NH_3$ in the hydrogen-containing stream can be 1.0 vol % or more, or 3.0 vol % or more, or 5.0 vol % or more, such as up to 15 vol % or possibly still higher. Further additionally or alternately, the combined content of $H_2$, $H_2O$, and $N_2$ in the hydrogen-containing stream introduced into the slurry hydroprocessing reactor can be 95 vol % or less, or 90 vol % or less, or 85 vol % or less, such as down to 75 vol % or possibly still lower. For example, the combined content of $H_2$, $H_2O$, and $N_2$ in the hydrogen-containing stream introduced into the slurry hydroprocessing reactor can be 75 vol % to 95 vol %.

FIG. 4 shows an example of a slurry hydroprocessing reactor. In FIG. 4, a feed 405 is mixed with at least one of fresh slurry hydrotreating catalyst 402 and hydrogen 401 prior to being introduced into slurry hydroprocessing reactor 410. Optionally, a catalyst precursor (not shown) can be added to feed 405 in place of at least a portion of slurry hydrotreating catalyst 402. Optionally, hydrogen stream 401 and/or slurry hydrotreating catalyst 402 can be introduced into the slurry hydroprocessing reactor 410 separately from feed 405. In the configuration shown in FIG. 4, pitch recycle stream 465 is combined with feed 405 prior to passing into slurry hydroprocessing reactor 410. In other aspects, pitch recycle stream 465 and feed 405 can be passed separately into slurry hydroprocessing reactor 410.

After exposing the feed to slurry hydroconversion conditions in slurry hydroprocessing reactor 410, the resulting slurry hydroprocessing effluent 415 can be passed into one or more separation stages. In the example shown in FIG. 4, the separation stages include a first separator 420 and a second separator 430. The first separator performs a high pressure vapor-liquid separation. The vapor fraction 422 corresponds to light gases and at least part of the reaction products. The liquid fraction 425 corresponds to a combination of vacuum gas oil and pitch. The liquid fraction 425 is passed into second separator 430, where the pitch fraction 465 for recycle is separated from a second product fraction 432. Second separator 430 can correspond to any convenient type of separator suitable for forming a pitch fraction, such as a vacuum distillation tower or a flash separator. A pitch removal stream 437 can also be formed, to remove a portion of the unconverted pitch from the recycle loop. The pitch fraction 465 can be passed into pitch recycle pump 463 prior to being combined with feed 405 and/or separately introduced into reactor 410.

Both vapor fraction 422 and second product fraction 432 can optionally undergo further separations and/or additional processing, as desired. For example, as shown in FIG. 4, the vapor fraction 422 can be passed into a subsequent hydrotreating or stabilizer stage 450 to form a hydrotreated vapor fraction 452. In some aspects, the light gases in vapor fraction 422 can include sufficient hydrogen for performing the subsequent hydrotreating 450. The subsequent hydrotreating can be used to reduce olefin content, reduce heteroatom content (such as nitrogen and/or sulfur), or a combination thereof. In the example shown in FIG. 4, the vapor fraction 422 (e.g., naphtha and distillate boiling range portions of hydroconversion effluent) is passed into hydrotreating stage 450 to form a hydrotreated or stabilized effluent 452. In such aspects, the second product fraction 432 of the hydroconversion effluent, including at least a portion of the vacuum gas oil, can bypass the hydrotreating stage 450. In other aspects, both the vapor fraction 422 and the second product fraction 432 can be passed into hydrotreating stage 450. Optionally, the hydrotreater/stabilizer can be integrated with the hydroconversion stage. For example, an initial separator can be used to separate the hydroconverted effluent into a lighter portion and a heavier portion that includes the bottoms. Such a separation can be performed at substantially the exit pressure of the hydroconversion stage. Additionally, any hydrogen in the gas exiting with the effluent can travel with the lighter portion. In some aspects, the hydrogen exiting with the lighter portion of the effluent can be sufficient to provide substantially all of the hydrogen treat gas that is needed for performing hydrotreating the hydrotreating stage 450. The lighter portion (plus hydrogen) can then be passed into the stabilizer without requiring re-pressurization. In other aspects, additional hydrogen can be provided to the hydrotreating stage 450, such as hydrogen generated from partial oxidation of pitch and/or hydrogen from another convenient source. It is noted that FIG. 4 corresponds to an example of a hydroconversion stage 140 (as shown in FIG. 1). In a configuration similar to FIG. 1, the hydroconversion effluent 145 can correspond to, for example, a combination of the hydrotreated effluent 452 and second product fraction 432 from FIG. 4.

In the configuration shown in FIG. 4, a pumparound recirculation loop is also shown. In the pumparound recirculation loop, a pumparound portion 446 of liquid fraction 425 is passed into pumparound pump 443 prior to passing the pumparound portion 446 into slurry hydroprocessing reactor 410.

Hydrotreatment Conditions

After hydroconversion, a hydrotreatment stage corresponding to a stabilizer can be used to reduce the reactivity of the hydroconversion effluent. This can be achieved by performing a mild hydrotreating that allows for saturation of olefins, termination of radicals, and reaction of other high reactivity functional groups that may have formed under the slurry hydroprocessing conditions. In some aspects, a portion of the hydroconversion effluent can be exposed to stabilization, such as a naphtha portion, a distillate portion, or a combination thereof. In other aspects, the input flow to stabilization can include a portion of the vacuum gas oil fraction of the hydroconversion effluent. In yet other aspects, substantially all of the hydroconversion effluent can be passed into the stabilizer. Still another option can be to pass a portion of the unconverted distillate or vacuum gas oil from the heavy hydrocarbon feed into the stabilizer. In aspects where only a portion of the hydroconversion effluent is exposed to stabilizer hydrotreatment conditions, a remaining portion of the hydroconversion effluent can by-pass the stabilizer and then be recombined with the stabilizer effluent. The combination of the stabilizer effluent (or at least a portion thereof) with the remaining portion of the hydroconversion effluent that by-passes the stabilizer can be referred to as the stabilizer product.

The catalysts used for the stabilizing hydrotreatment can include conventional hydroprocessing catalysts, such as those that comprise at least one Group VIII non-noble metal (Columns 8-10 of IUPAC periodic table), preferably Fe, Co, and/or Ni, such as Co and/or Ni; and at least one Group VI metal (Column 6 of IUPAC periodic table), preferably Mo and/or W. Such hydroprocessing catalysts optionally include transition metal sulfides that are impregnated or dispersed on a refractory support or carrier such as alumina and/or silica. The support or carrier itself typically has no significant/measurable catalytic activity. Substantially carrier- or support-free catalysts, commonly referred to as bulk catalysts, generally have higher volumetric activities than their supported counterparts.

The catalysts can either be in bulk form or in supported form. In addition to alumina and/or silica, other suitable support/carrier materials can include, but are not limited to, zeolites, titania, silica-titania, and titania-alumina. Suitable aluminas are porous aluminas such as gamma or eta having average pore sizes from 50 to 200 Å, or 75 to 150 Å; a surface area from 100 to 300 m$^2$/g, or 150 to 250 m$^2$/g; and a pore volume of from 0.25 to 1.0 cm$^3$/g, or 0.35 to 0.8 cm$^3$/g. More generally, any convenient size, shape, and/or pore size distribution for a catalyst suitable for hydrotreatment of a distillate (including lubricant base oil) boiling range feed in a conventional manner may be used. It is within the scope of the present invention that more than one type of hydroprocessing catalyst can be used in one or multiple reaction vessels.

The at least one Group VIII non-noble metal, in oxide form, can typically be present in an amount ranging from about 2 wt % to about 40 wt %, preferably from about 4 wt % to about 15 wt %. The at least one Group VI metal, in oxide form, can typically be present in an amount ranging from about 2 wt % to about 70 wt %, preferably for supported catalysts from about 6 wt % to about 40 wt % or from about 10 wt % to about 30 wt %. These weight percents are based on the total weight of the catalyst. Suitable metal catalysts include cobalt/molybdenum (1-10% Co as oxide, 10-40% Mo as oxide), nickel/molybdenum (1-10% Ni as oxide, 10-40% Co as oxide), or nickel/tungsten (1-10% Ni as oxide, 10-40% W as oxide) on alumina, silica, silica-alumina, or titania.

In some aspects, hydrotreating conditions can include temperatures of 200° C. to 400° C., or 200° C. to 350° C., or 250° C. to 325° C.; pressures of 250 psig (1.8 MPag) to 1500 psig (10.3 MPag), or 250 psig (1.8 MPag) to 1000 psig (6.9 MPag), or 300 psig (2.1 MPag) to 800 psig (5.5 MPag); liquid hourly space velocities (LHSV) of 0.1 $hr^{-1}$ to 10 $hr^{-1}$; and hydrogen treat gas rates of 200 scf/B (35.6 $m^3/m^3$) to 10,000 scf/B (1781 $m^3/m^3$), or 500 (89 $m^3/m^3$) to 10,000 scf/B (1781 $m^3/m^3$). In other aspects, higher severity hydrotreating conditions may be desirable in order to further reduce the sulfur and/or nitrogen content in the hydroconverted fractions. In such aspects, a higher temperature can potentially be used, such as a temperature of 260° C. to 425° C.; and/or a higher pressure can be used, such as a pressure of 800 psig (5.5 MPag) to 2000 psig (13.8 MPag).

Partial Oxidation Reactor

In various aspects, the portion of the pitch that is not recycled back to the slurry hydroprocessing reactor (or other hydroconversion reactor) can be passed into a partial oxidation reactor. A partial oxidation reactor can be used to convert the slurry hydroprocessing pitch into hydrogen, carbon monoxide, and ash which can then be pelletized. The hydrogen generated during partial oxidation can be used as at least part of the hydrogen delivered to the slurry hydroprocessing reactor and/or the stabilizing hydrotreater. The pelletized ash thus corresponds to the other carbon-containing product that requires transport away from the extraction site.

In some aspects, the portion of the pitch used as the input flow to a partial oxidation reactor can have an ash content of 1.0 wt % or more, or 2.0 wt % or more, or 10 wt % or more, or 20 wt % or more, such as up to 40 wt %.

Additional Embodiments

Embodiment 1. A method for upgrading a heavy hydrocarbon feed, comprising: splitting an initial feedstock to form at least a first feedstock portion and a second feedstock portion, the first feedstock portion comprising 15 wt % to 95 wt % of the initial feedstock, the initial feedstock comprising a heavy hydrocarbon feed and 10 wt % or more of a first diluent, the first diluent comprising a 177° C.– portion; separating the first feedstock portion to form a first fraction comprising a 566° C.+ portion, a diluent fraction comprising at least a portion of the first diluent, and one or more additional fractions comprising a 177° C.+ portion, the heavy hydrocarbon feed comprising an API gravity of 15° or less; exposing at least a portion of the first fraction to hydroconversion conditions in a hydroconversion stage to form a hydroconverted effluent, the hydroconversion conditions comprising a net conversion of less than 90 wt % relative to 524° C.; separating at least a pitch fraction comprising a 566° C.+ portion and an olefin-containing fraction from the hydroconverted effluent; hydrotreating the olefin-containing fraction to form a hydrotreated product; and blending the second feedstock portion, the one or more additional fractions, and at least a portion of the hydrotreated product to form a processed heavy hydrocarbon product having a kinematic viscosity at 7.5° C. of 350 cSt or less, an API gravity of 19° or more, the processed heavy hydrocarbon product comprising 20 wt % or less of a 177° C.– fraction relative to a weight of the processed heavy hydrocarbon product.

Embodiment 2. The method of Embodiment 1, wherein separating the first feedstock portion further comprises forming a bypass fraction comprising a 566° C.+ portion, and wherein the blending comprises blending the second feedstock portion, the bypass fraction, the one or more additional fractions, and at least a portion of the hydrotreated product to form the processed heavy hydrocarbon product, the processed heavy hydrocarbon product comprising 5 wt % to 15 wt % of the bypass fraction, relative to a weight of the processed heavy hydrocarbon product.

Embodiment 3. The method of Embodiment 2, wherein separating at least a pitch fraction and an olefin-containing fraction from the hydroconverted effluent further comprises separating a remaining fraction from the hydroconverted effluent, and wherein the blending comprises blending the remaining fraction, the second feedstock portion, the bypass fraction, the one or more additional fractions, and the at least a portion of the hydrotreated product to form the processed heavy hydrocarbon product.

Embodiment 4. The method of any of the above embodiments, wherein the processed heavy hydrocarbon product comprises 40 wt % or more of a 343° C. — 566° C. fraction relative to a weight of the processed heavy hydrocarbon product, or wherein the one or more additional fractions comprise 5.0 wt % or less of the first diluent relative to a weight of the one or more additional fractions, or a combination thereof.

Embodiment 5. The method of any of the above embodiments, wherein the hydroconverted effluent further comprises a hydroconverted naphtha fraction, a hydroconverted distillate fraction, and a hydroconverted vacuum gas oil fraction, a weight of the hydroconverted vacuum gas oil fraction in the hydroconverted effluent being greater than a weight of the hydroconverted distillate fraction.

Embodiment 6. The method of any of the above embodiments, wherein separating the first feedstock portion comprises performing solvent deasphalting on at least a portion of the first feedstock portion, and wherein the first fraction comprises deasphalter rock.

Embodiment 7. The method of any of the above embodiments, wherein separating the initial feedstock comprises: separating the initial feedstock under atmospheric separation conditions to form at least an atmospheric bottoms fraction, a distillate fraction, and the diluent fraction, the atmospheric bottoms fraction comprising the bypass fraction; and separating at least a portion of the atmospheric bottoms fraction under vacuum separation conditions to form at least a vacuum bottoms fraction and one or more vacuum gas oil fractions, wherein exposing at least a portion of the first fraction to hydroconversion conditions comprises exposing at least a portion of the vacuum bottoms fraction to the hydroconversion conditions.

Embodiment 8. The method of any of the above embodiments, i) wherein the bypass fraction comprises 10 wt % or less of the first diluent relative to a weight of the bypass fraction; ii) wherein a weight of the first fraction is 40% or less of a weight of the heavy hydrocarbon feed; iii) wherein the first fraction comprises 60 wt % or more of 566° C.+ components relative to a weight of the first fraction; or iv) a combination of two or more of i)-iii).

Embodiment 9. The method of any of the above embodiments, wherein exposing at least a portion of the first fraction to hydroconversion conditions comprises exposing at least a portion of the first fraction and a recycle portion of the pitch fraction to the hydroconversion conditions, the recycle portion of the pitch fraction comprising more than 50 wt % of 566° C.+ components, the at least a portion of the first fraction and the recycle portion of the pitch optionally comprising a combined feed ratio of 1.5 to 3.5.

Embodiment 10. The method of any of the above embodiments, wherein the hydroconversion conditions comprise a per-pass conversion of 50 wt % or less relative to 524° C., or wherein the hydroconversion conditions comprise a net conversion of 60 wt % to 89 wt % relative to 524° C., or a combination thereof.

Embodiment 11. The method of any of the above embodiments, further comprising exposing a product portion of the pitch fraction to partial oxidation conditions to generate at least a hydrogen stream, wherein the hydroconversion conditions comprising exposing the at least a portion of the first fraction to hydrogen from the hydrogen stream.

Embodiment 12. The method of any of the above embodiments, wherein the first fraction comprises a first nitrogen content, and wherein the hydroconverted effluent comprises an effluent 177° C.+ portion, the effluent 177° C.+ portion comprising a nitrogen content that is at least 75 wt % of the first nitrogen content.

Embodiment 13. A system for upgrading a heavy hydrocarbon feed, comprising: a feed splitter comprising a first splitter outlet and a second splitter outlet; an atmospheric separation stage comprising an atmospheric stage inlet in fluid communication with the first splitter outlet, an atmospheric bottoms outlet, and one or more additional outlets; a vacuum separation stage comprising a vacuum stage inlet in fluid communication with the atmospheric bottoms outlet, a vacuum bottoms outlet, and one or more vacuum gas oil outlets; a slurry hydroprocessing stage comprising a slurry hydroprocessing reactor, a reactor inlet in fluid communication with the vacuum bottoms outlet, a light ends outlet, a slurry hydroprocessing effluent outlet, and a pitch outlet; a hydrotreating stage comprising a hydrotreating inlet in fluid communication with the slurry hydroprocessing effluent outlet, and a hydrotreated effluent outlet; and a blending stage forming a blended product, the blending stage being in fluid communication with the second splitter outlet, the one or more additional outlets, the one or more vacuum gas oil outlets, and the hydrotreated effluent outlet.

Embodiment 14. The system of Embodiment 13, the system further comprising a partial oxidation reactor in fluid communication with the pitch outlet, the partial oxidation comprising a hydrogen outlet in fluid communication with at least one of the slurry hydroprocessing reactor and the hydrotreating stage.

Embodiment 15. The system of Embodiment 13 or 14, wherein the system further comprises a solvent deasphalting stage, the slurry hydroprocessing stage being in fluid communication with the vacuum bottoms outlet via the solvent deasphalting stage.

Additional Embodiment A. The method of any of Embodiments 1 to 12, wherein the first feedstock portion comprises 15 wt % to 80 wt % of the initial feedstock, or 20 wt % to 95 wt %, or 30 wt % to 95 wt %, or 30 wt % to 80 wt %, or 30 wt % to 70 wt %, or 15 wt % to 50 wt %, or 50 wt % to 95 wt %, or 50 wt % to 80 wt %.

Additional Embodiment B. The method of any of Embodiments 1 to 12, wherein the hydroconversion stage comprises one or more slurry hydroprocessing reactors.

Additional Embodiment C. The method of any of Embodiments 1 to 12, wherein the olefin-containing fraction comprises a 177° C.+ portion.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The present invention has been described above with reference to numerous embodiments and specific examples. Many variations will suggest themselves to those skilled in this art in light of the above detailed description. All such obvious variations are within the full intended scope of the appended claims.

What is claimed is:

1. A method for upgrading a heavy hydrocarbon feed, comprising:
  splitting an initial feedstock to form at least a first feedstock portion and a second feedstock portion, the first feedstock portion comprising 15 wt % to 95 wt % of the initial feedstock, the initial feedstock comprising a heavy hydrocarbon feed and 10 wt % or more of a first diluent, the first diluent comprising a 177° C.− portion;
  separating the first feedstock portion to form a first fraction comprising a 566° C.+ portion, a diluent fraction comprising at least a portion of the first diluent, and one or more additional fractions comprising a 177° C.+ portion, the heavy hydrocarbon feed comprising an API gravity of 15° or less;
  exposing at least a portion of the first fraction to hydroconversion conditions in a hydroconversion stage to form a hydroconverted effluent, the hydroconversion conditions comprising a net conversion of less than 90 wt % relative to 524° C.;
  separating at least a pitch fraction comprising a 566° C.+ portion and an olefin-containing fraction from the hydroconverted effluent;
  hydrotreating the olefin-containing fraction to form a hydrotreated product; and
  blending the second feedstock portion, the one or more additional fractions, and at least a portion of the hydrotreated product to form a processed heavy hydrocarbon product having a kinematic viscosity at 7.5° C. of 350 cSt or less, an API gravity of 19° or more, the processed heavy hydrocarbon product comprising 20 wt % or less of a 177° C.− fraction relative to a weight of the processed heavy hydrocarbon product,
  wherein the exposing at least a portion of the first fraction to hydroconversion conditions comprises exposing at least a portion of the first fraction and a recycle portion of the pitch fraction to the hydroconversion conditions, the hydroconversion conditions further comprising a per-pass conversion of 50 wt % or less relative to 524° C.

2. The method of claim 1, wherein separating the first feedstock portion further comprises forming a bypass fraction comprising a 566° C.+ portion, and wherein the blending comprises blending the second feedstock portion, the bypass fraction, the one or more additional fractions, and at least a portion of the hydrotreated product to form the processed heavy hydrocarbon product, the processed heavy hydrocarbon product comprising 5 wt % to 15 wt % of the bypass fraction, relative to a weight of the processed heavy hydrocarbon product.

3. The method of claim 2, wherein separating at least a pitch fraction and an olefin-containing fraction from the hydroconverted effluent further comprises separating a remaining fraction from the hydroconverted effluent, and wherein the blending comprises blending the remaining fraction, the second feedstock portion, the bypass fraction, the one or more additional fractions, and the at least a portion of the hydrotreated product to form the processed heavy hydrocarbon product.

4. The method of claim 2, wherein separating the initial feedstock comprises:
   separating the initial feedstock under atmospheric separation conditions to form at least an atmospheric bottoms fraction, a distillate fraction, and the diluent fraction, the atmospheric bottoms fraction comprising the bypass fraction; and
   separating at least a portion of the atmospheric bottoms fraction under vacuum separation conditions to form at least a vacuum bottoms fraction and one or more vacuum gas oil fractions, wherein exposing at least a portion of the first fraction to hydroconversion conditions comprises exposing at least a portion of the vacuum bottoms fraction to the hydroconversion conditions.

5. The method of claim 2, i) wherein the bypass fraction comprises 10 wt % or less of the first diluent relative to a weight of the bypass fraction; ii) wherein a weight of the first fraction is 40% or less of a weight of the heavy hydrocarbon feed; iii) wherein the first fraction comprises 60 wt % or more of 566° C.+ components relative to a weight of the first fraction; or iv) a combination of two or more of i)-iii).

6. The method of claim 1, wherein the processed heavy hydrocarbon product comprises 40 wt % or more of a 343° C.-566° C. fraction relative to a weight of the processed heavy hydrocarbon product, or wherein the one or more additional fractions comprise 5.0 wt % or less of the first diluent relative to a weight of the one or more additional fractions, or a combination thereof.

7. The method of claim 1, wherein the hydroconverted effluent further comprises a hydroconverted naphtha fraction, a hydroconverted distillate fraction, and a hydroconverted vacuum gas oil fraction, a weight of the hydroconverted vacuum gas oil fraction in the hydroconverted effluent being greater than a weight of the hydroconverted distillate fraction.

8. The method of claim 1, wherein separating the first feedstock portion comprises performing solvent deasphalting on at least a portion of the first feedstock portion, and wherein the first fraction comprises deasphalter rock.

9. The method of claim 1, wherein the recycle portion of the pitch fraction comprises more than 50 wt % of 566° C.+ components, and wherein the at least a portion of the first fraction and the recycle portion of the pitch optionally comprise a combined feed ratio of 1.5 to 3.5.

10. The method of claim 1, further comprising exposing a product portion of the pitch fraction to partial oxidation conditions to generate at least a hydrogen stream, wherein the hydroconversion conditions comprising exposing the at least a portion of the first fraction to hydrogen from the hydrogen stream.

11. The method of claim 1, wherein the first fraction comprises a first nitrogen content, and wherein the hydroconverted effluent comprises an effluent 177° C.+ portion, the effluent 177° C.+ portion comprising a nitrogen content that is at least 75 wt % of the first nitrogen content.

* * * * *